US012348912B2

(12) United States Patent
Umezu et al.

(10) Patent No.: US 12,348,912 B2
(45) Date of Patent: Jul. 1, 2025

(54) IMAGE PROCESSING DEVICE AND IMAGE PROCESSING METHOD FOR OBTAINING TWO SUB-IMAGES FROM ORIGINAL IMAGE

(71) Applicant: Socionext Inc., Kanagawa (JP)

(72) Inventors: Yuji Umezu, Yokohama (JP); Soichi Hagiwara, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 51 days.

(21) Appl. No.: 18/453,767

(22) Filed: Aug. 22, 2023

(65) Prior Publication Data

US 2024/0073390 A1 Feb. 29, 2024

(30) Foreign Application Priority Data

Aug. 25, 2022 (JP) .................. 2022-133926

(51) Int. Cl.
*H04N 9/78* (2006.01)
*H04N 23/80* (2023.01)
*H04N 23/84* (2023.01)

(52) U.S. Cl.
CPC .............. *H04N 9/78* (2013.01); *H04N 23/815* (2023.01); *H04N 23/843* (2023.01)

(58) Field of Classification Search
CPC ...... H04N 9/78; H04N 23/815; H04N 23/843; H04N 23/90; H04N 1/646; H04N 23/88; H04N 25/11; H04N 25/42
See application file for complete search history.

(56) References Cited

U.S. PATENT DOCUMENTS

| 2014/0056577 A1* | 2/2014 | Ogawa | H04N 19/30 386/355 |
| 2014/0253808 A1* | 9/2014 | Tachi | H04N 9/64 348/624 |
| 2016/0140696 A1* | 5/2016 | Yamada | H04N 23/10 382/167 |
| 2016/0260200 A1 | 9/2016 | Kobayashi et al. | |

FOREIGN PATENT DOCUMENTS

| JP | 2012-191287 A | 10/2012 |
| JP | 2015-008414 A | 1/2015 |
| WO | 2014/042155 A1 | 3/2014 |
| WO | 2014/103230 A1 | 7/2014 |

* cited by examiner

*Primary Examiner* — Mekonnen D Dagnew
(74) *Attorney, Agent, or Firm* — Rimon P.C.

(57) ABSTRACT

An image processing device includes a memory and a processor configured to separate first image data obtained by an image sensor having a Bayer arrangement, into second image data that includes brightness information, and third image data that includes color information and has a lower resolution than the first image data and the second image data, wherein a pixel arrangement of the third image data includes two pixels in each of a horizontal direction and a vertical direction, among which two pixels on one diagonal are of a same type, two pixels on another diagonal are of types different from each other, and the two pixels on said another diagonal are of the types different from the two pixels on the one diagonal.

13 Claims, 16 Drawing Sheets

IMAGE PROCESSING DEVICE AND IMAGE PROCESSING METHOD FOR OBTAINING TWO SUB-IMAGES FROM ORIGINAL IMAGE

CROSS-REFERENCE TO RELATED APPLICATIONS

The present application is based upon and claims the benefit of priority of Japanese Patent Application No. 2022-133926 filed on Aug. 25, 2022, the entire contents of which are hereby incorporated by reference.

TECHNICAL FIELD

The present disclosure relates to an image processing device and a method of image processing.

BACKGROUND ART

There have been techniques that separate image data obtained from a camera into high-frequency components and low-frequency components. There have been techniques in which a Bayer image is separated into high-frequency components that indicate color information and low-frequency components that indicate brightness information, to which different filter processes are applied, to synthesize these components. There have been techniques that reduce the processing load by separating a high-resolution image into high-frequency components and low-frequency components to execute image processing.

RELATED ART DOCUMENTS

Patent Documents

[Patent Document 1] Japanese Laid-Open Patent Application No. 2012-191287
[Patent Document 2] Japanese Laid-Open Patent Application No. 2015-008414
[Patent Document 3] WO No. 2014/042155
[Patent Document 4] WO No. 2014/103230

In the case where image data is separated into high-frequency components and low-frequency components, if the pixel arrangement of an image is different from a Bayer arrangement, an additional process is required for converting the image into an image in a Bayer arrangement in subsequent processes of white balancing, color component correction, edge enhancement, and the like. In addition, although the resolution of the image data after image processing can be made higher as the resolution of the image data is higher, the load (power consumption and processing time) of the image processing on the image data also becomes higher. Further, in the case where an image sensor has a pixel arrangement in which each pixel in a Bayer arrangement is expanded to multiple pixels, a method of separating image data obtained from the image sensor into high-frequency components and low-frequency components has not been considered.

SUMMARY

In one aspect of the present disclosure, an image processing device includes a memory and a processor configured to separate first image data obtained by an image sensor having a Bayer arrangement, into second image data that includes brightness information, and third image data that includes color information and has a lower resolution than the first image data and the second image data, wherein a pixel arrangement of the third image data includes two pixels in each of a horizontal direction and a vertical direction, among which two pixels on one diagonal are of a same type, two pixels on another diagonal are of types different from each other, and the two pixels on said another diagonal are of the types different from the two pixels on the one diagonal.

EMBODIMENTS

In the following, embodiments will be described with reference to the drawings. In the following description, image data may be simply referred to as an image.

According to the disclosed techniques, the load imposed on image processing of image data can be reduced.

First Embodiment

Figure 1:
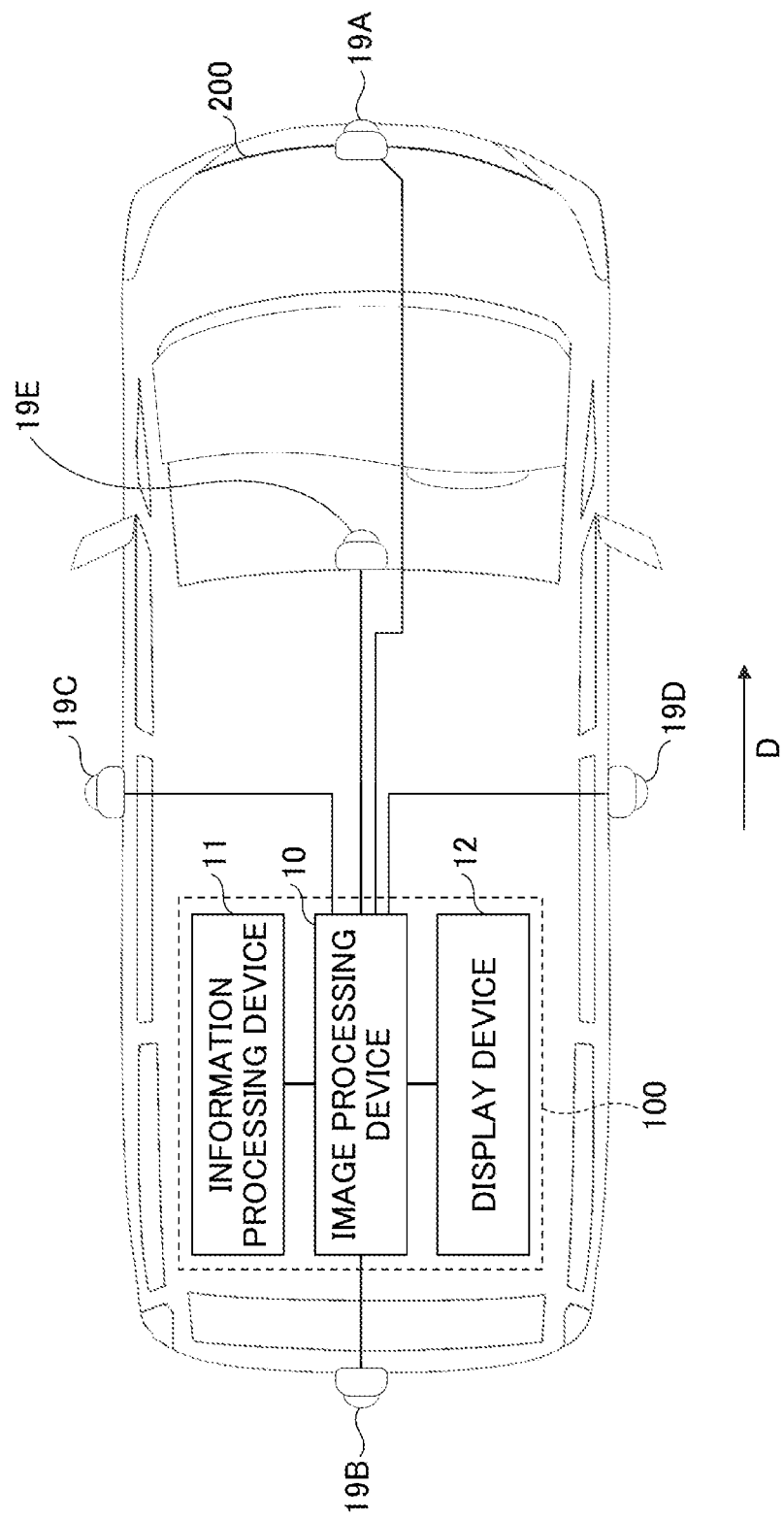
FIG. 1 is a schematic diagram illustrating an example of an image processing system that includes an image processing device according to a first embodiment.

FIG. 1 illustrates an example of an image processing system that includes an image processing device according to a first embodiment. The image processing system 100 illustrated in FIG. 1 is installed in a mobile body 200 such as an automobile or the like. On the front, rear, left, and right sides with respect to a traveling direction D of the mobile body 200, and in the front of the vehicle interior of the mobile body 200, imaging device 19A, 19B, 19C, 19D, and 19E such as cameras are installed. In the following, in the case where the imaging device 19A, 19B, 19C, 19D, and 19E do not need to be described distinctively, these imaging devices may be referred to as the imaging device(s) 19.

Note that the number of the imaging devices 19 installed in the mobile body 200 and their installation positions are not limited as illustrated in FIG. 1. For example, one imaging device 19 may be installed only on the front side of the mobile body 200, or two imaging devices 19 may be installed only on the front and rear sides. Alternatively, the imaging device 19 may be installed on the ceiling of the mobile body 200.

Also, the mobile body 200 in which the image processing system 100 is installed is not limited to an automobile, and may be, for example, a transfer robot operating in a factory, or a drone. In addition, the image processing system 100 may be, for example, a system that processes images obtained from an imaging device such as a monitoring camera, a digital still camera, a digital camcorder, an action camera, a camera of a smartphone, a camera of a game console, or the like. In this case, the imaging device does not need to be directly connected to the image processing device 10, and may be installed at a location physically remote from the image processing device 10.

Each of the imaging devices 19 is connected to the image processing device 10 by signal wires or by radio. Also, the distance between each of the imaging devices 19 and the image processing device 10 may be greater than a distance as imagined with FIG. 1. For example, image data obtained by the imaging device 19 may be transmitted to the image processing device 10 via a network. In this case, the image processing device 10 and an information processing device 11 may be implemented by cloud computing.

The image processing system 100 includes the image processing device 10, the information processing device 11, and a display device 12. Note that in FIG. 1, in order to make the description easier to understand, the image processing system 100 is illustrated to overlap a schematic diagram of the mobile body 200 as viewed from above. However, in practice, the image processing device 10 and the information processing device 11 are mounted on a control board installed in the mobile body 200, and the display device 12 is installed at a position within the mobile body 200 that is visible to a person such as a driver. Note that the image processing device 10 may be mounted on the control board or the like as part of the information processing device 11.

Figure 2:
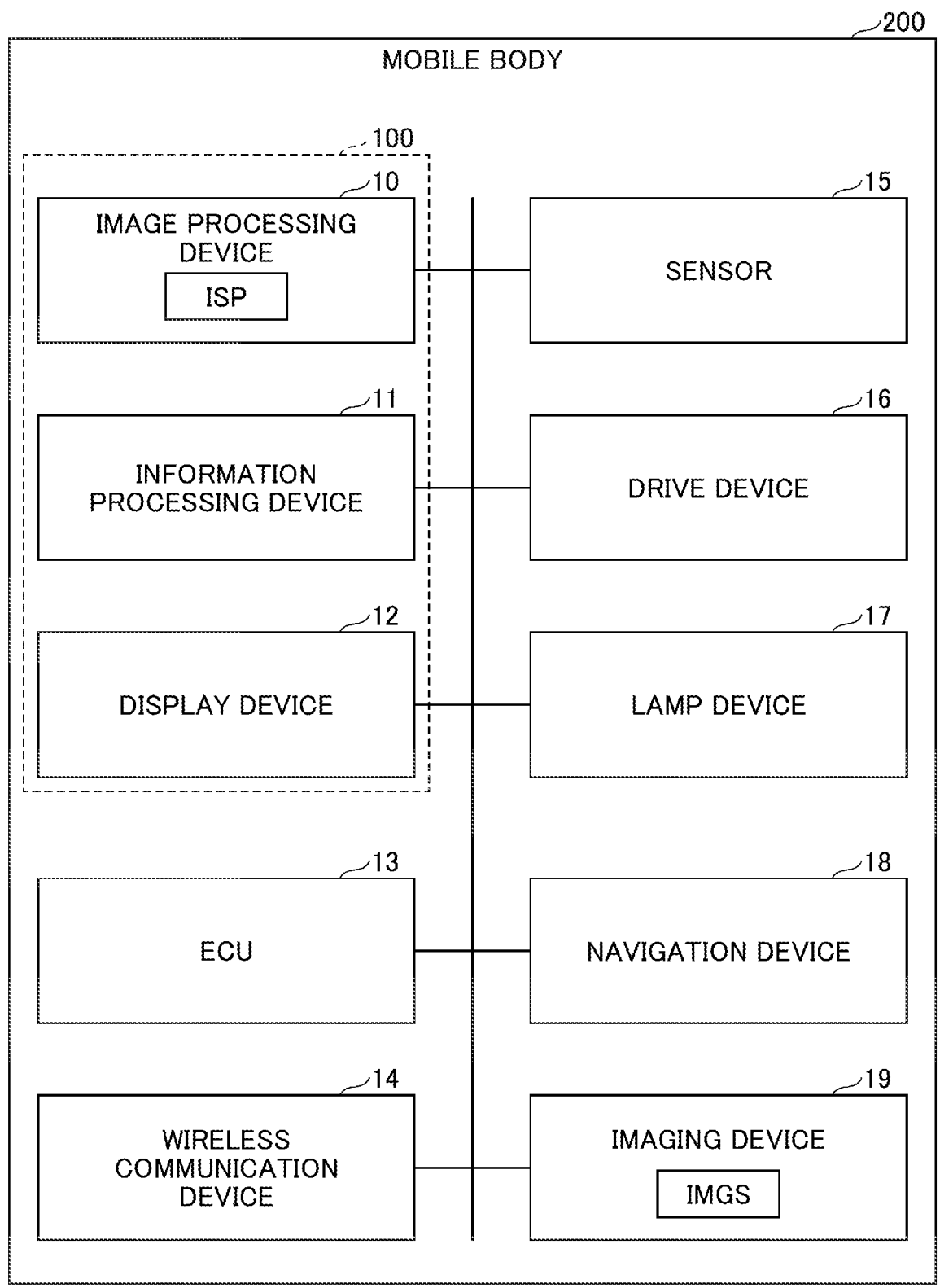
FIG. 2 is a block diagram illustrating an overview of a configuration of various devices installed in a mobile body in FIG. 1.

FIG. 2 illustrates an overview of a configuration of various devices installed in the mobile body 200 in FIG. 1. The mobile body 200 includes the image processing device 10, the information processing device 11, the display device 12, at least one ECU (Electronic Control Unit) 13, and a wireless communication device 14 that are interconnected through an internal network. The mobile body 200 also includes a sensor 15, a drive device 16, a lamp device 17, a navigation device 18, and an imaging device 19. For example, the internal network is an in-vehicle network such as a CAN (Controller Area Network), Ethernet (registered trademark), or the like.

The image processing device 10 executes image processing on image data (frame data) obtained by the imaging device 19. The image processing device 10 includes an image signal processor (ISP). The information processing device 11 may function as a computer that controls the units of the mobile body 200. The information processing device 11 controls the ECU 13, to control the entire mobile body 200. The information processing device 11 may execute a recognition process of recognizing an object outside the mobile body 200 based on an image generated by the image processing device 10, and may execute a tracking process of tracking the recognized object.

The display device 12 displays an image generated by the image processing device 10, a corrected image, and the like. The display device 12 may display an image in the backward direction of the mobile body 200 in real time as the mobile body 200 travels backward (backs up). Also, the display device 12 may display an image output from the navigation device 18.

The ECU 13 is provided corresponding to each mechanical unit such as an engine or transmission. The ECU 13 controls a corresponding mechanical unit based on instructions from the information processing device 11. The wireless communication device 14 communicates with a device external to the mobile body 200. The sensor 15 is a sensor to detect various types of information. The sensor 15 may include, for example, a position sensor to obtain current positional information of the mobile body 200. Also, the sensor 15 may include a speed sensor to detect the speed of the mobile body 200.

The drive device 16 includes various devices for moving the mobile body 200. The drive device 16 may include, for example, an engine, a steering gear (steering), and a braking device (brake). The lamp device 17 includes various lighting devices installed in the mobile body 200. The lamp device 17 may include, for example, a headlight (headlamp), lamps of a direction indicator (blinker), a backlight, and a brake lamp. The navigation device 18 is a device to guide a route to a destination by sound and display.

The imaging device 19 includes an image sensor IMGS that has pixels installed in a Bayer arrangement, where the pixels include multiple types of filters that transmit, for example, red light R, green light G, and blue light B. In other words, the image sensor IMGS includes multiple types of pixels where the types are different from one another in the wavelength range of light to be detected. In a Bayer arrangement, pixel groups each of which includes four pixels (one red pixel, two green pixels, and one blue pixel) are arranged repeatedly. Image data obtained by the imaging device 19 is processed by the image processing device 10.

Note that as will be described with reference to FIG. 12, the image sensor IMGS may include filters of the same type corresponding to a pixel group being four pixels that are arranged two by two in each of the horizontal direction and the vertical direction. In this case, multiple pixels corresponding to two pixel groups on one diagonal are green pixels that output green information as the pixel values. Multiple pixels corresponding to one of two pixel groups on the other diagonal are red pixels that output red information as the pixel values, and multiple pixels corresponding to the other of the two pixel groups on the other diagonal are blue pixels that output blue information as the pixel values. In addition, the four pixel groups have a Bayer arrangement. Note that the number of pixels included in each pixel group is not limited to four, and the pixel group may include an arrangement of more than two pixels in each of the horizontal direction and the vertical direction, for example, nine pixels of three by three.

Figure 3:
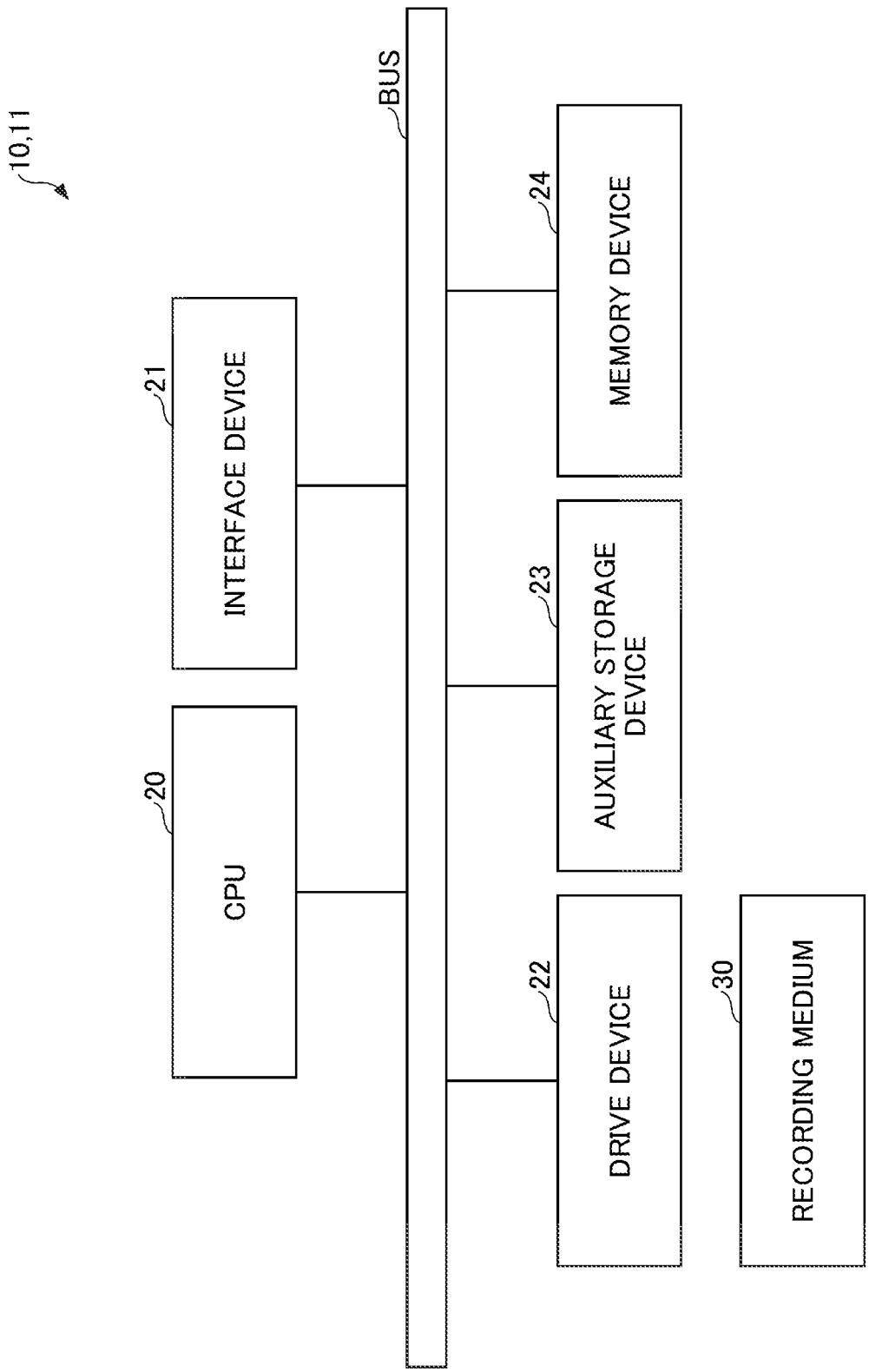
FIG. 3 is a block diagram illustrating an example of a configuration of the image processing device and the information processing device illustrated in FIG. 2.

FIG. 3 illustrates an example of a configuration of the image processing device 10 and the information processing device 11 in FIG. 2. The configurations of the image processing device 10 and the information processing device 11 are similar to each other; therefore, in the following, the configuration of the image processing device 10 will be described. For example, the image processing device 10 includes a CPU 20, an interface device 21, a drive device 22, an auxiliary storage device 23, and a memory device 24 that are interconnected by a bus BUS.

The CPU 20 executes various types of image processing as will be described later, by executing an image processing program stored in the memory device 24. The interface device 21 is used for connecting to a network (not illustrated). The auxiliary storage device 23 is, for example, an HDD (Hard Disk Drive) or an SSD (Solid State Drive), to hold various parameters to be used for the image processing program, image data, and image processing.

The memory device 24 is, for example, a DRAM (Dynamic Random Access Memory), to hold the image processing program or the like transferred from the auxiliary storage device 23. The drive device 22 includes an interface for connecting a recording medium 30, to transfer the image processing program stored in the recording medium 30 to the auxiliary storage device 23, for example, based on instructions from the CPU 20. Note that the drive device 22 may transfer image data or the like stored in the auxiliary storage device 23 to the recording medium 30.

Figure 4:
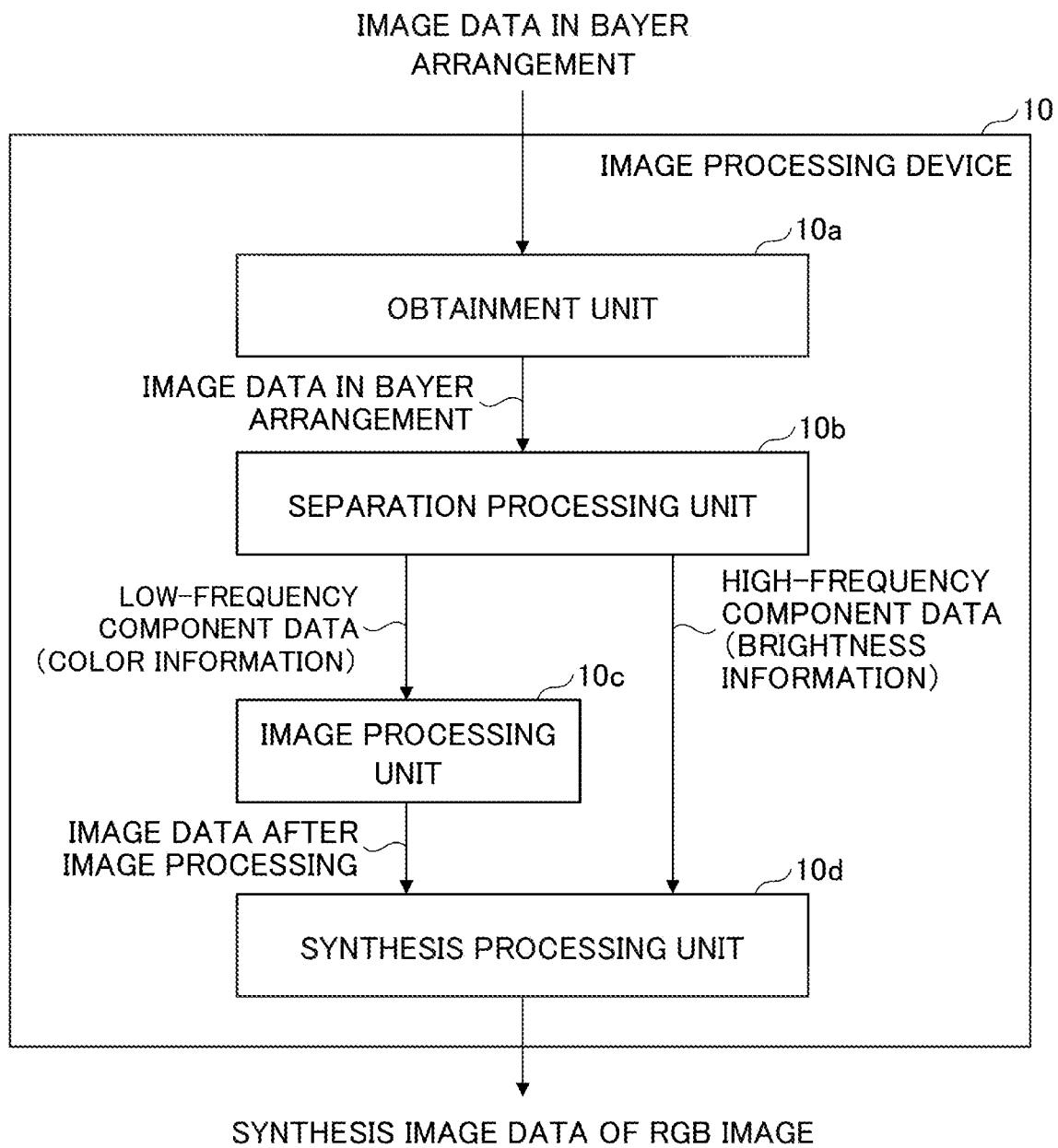
FIG. 4 is a block diagram illustrating an example of a functional configuration of the image processing device in FIG. 2.

FIG. 4 illustrates an example of a functional configuration of the image processing device 10 in FIG. 2. The image processing device 10 has an obtainment unit 10*a*, a separation processing unit 10*b*, an image processing unit 10*c*, and a synthesis processing unit 10*d*. The obtainment unit 10*a* obtains image data that shows images around the mobile body 200 captured by the imaging devices 19. For example, the image data is an example of first image data output from the image sensor IMGS having the Bayer arrangement.

The separation processing unit 10*b* separates image data in the Bayer arrangement obtained by the obtainment unit 10*a* into high-frequency component data that includes brightness information, and low-frequency component data that includes color information and has a lower resolution than the image data in the Bayer arrangement and the high-frequency component data.

The pixel arrangement of the low-frequency component data includes two pixels in each of a horizontal direction and a vertical direction, two pixels on one diagonal are of the same type, two pixels on the other diagonal are of types different from each other, and the two pixels on the other diagonal are of the types different from that of the two pixels on the one diagonal. For example, the low-frequency component data includes pixel values of the pixels in the Bayer arrangement, and has a lower resolution than the original image data in the Bayer arrangement obtained by the obtainment unit 10*a*. Alternatively, the low-frequency component data includes pixel values of a pixel arrangement similar to the Bayer arrangement, in which two pixels on one diagonal include brightness information, and two pixels on the other diagonal include red information and blue information, respectively. The high-frequency component data is an example of second image data, and the low-frequency component data is an example of third image data that includes pixel values of the pixels in the Bayer arrangement.

For example, the separation processing unit 10*b* executes a demosaic process on the image data in the Bayer arrangement obtained by the obtainment unit 10*a*, to generate RGB image data. Then, the separation processing units 10*b* extracts low-frequency components from the RGB image data to generate low-frequency component data, and calculates a difference between the brightness information on the RGB image data and the brightness information on the low-frequency component data, to generate high-frequency component data.

The image processing unit 10*c* executes image processing on the low-frequency component data, to generate image data after image processing. The image data after image processing is an example of fourth image data. The low-frequency component data has a lower resolution than the original image data in the Bayer arrangement. Therefore, compared with the case of applying image processing to the original image data as it is, the image processing unit 10*c* can reduce the load imposed on image processing.

For example, the image processing unit 10*c* converts the low-frequency component data that includes pixel values in the Bayer arrangement into RGB image data by the demosaic process, and executes image processing on the RGB image data generated by the conversion. Alternatively, the image processing unit 10*c* converts the low-frequency component data that includes pixel values in an arrangement similar to the Bayer arrangement into RGB image data by the RGB conversion process, and executes image processing on the RGB image data generated by the conversion. Note that the image processing unit 10*c* may execute a noise removal process or the like on the high-frequency component data.

The synthesis processing unit 10*d* synthesizes the image data after image processing by the image processing unit 10*c* with the high-frequency component image data, to generate synthesis image data of an RGB image. Alternatively, the synthesis processing unit 10*d* synthesizes the image data after image processing by the image processing unit 10*c* with the high-frequency component image data after image processing by the image processing unit 10*c*, to generate synthesis image data of an RGB image. For example, the resolution of the synthesis image data is the same as the resolution of the image data obtained by the obtainment unit 10*a*. The high-frequency component data after image processing by the image processing unit 10*c* is an example of fifth image data. The synthesis image data is an example of sixth image data.

Figure 5:
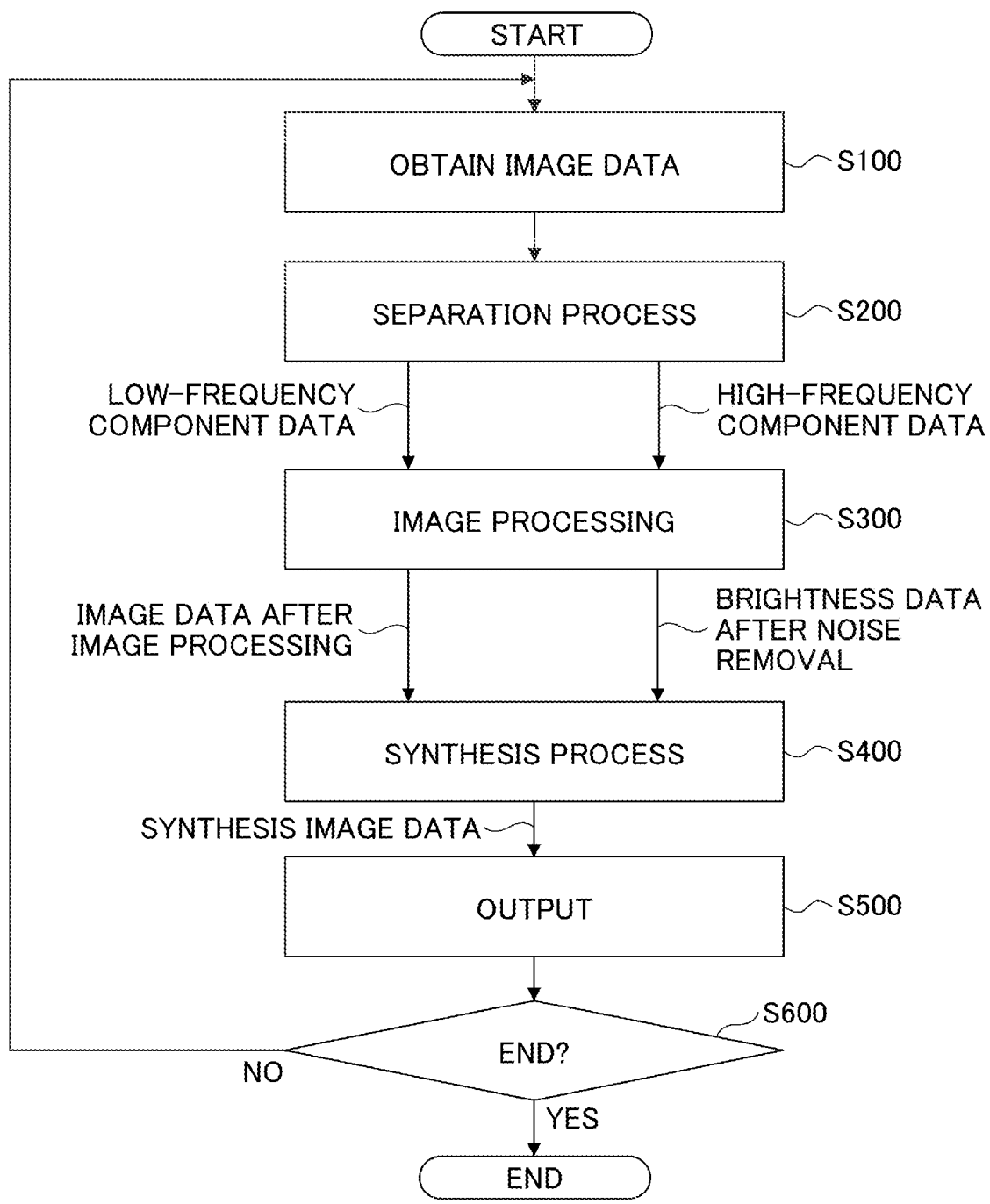
FIG. 5 is a flow chart illustrating an example of image processing executed by the image processing device in FIG. 2.

FIG. 5 illustrates an example of image processing executed by the image processing device 10 in FIG. 2. In other words, FIG. 5 illustrates an example of a method of image processing executed by the image processing device 10. The flow illustrated in FIG. 5 is implemented, for example, by the CPU 20 of the image processing device 10 executing an image processing program. Note that the flow illustrated in FIG. 5 may be implemented by hardware such as a field-programmable gate array (FPGA) or an application specific integrated circuit (ASIC) installed on the image processing device 10. Alternatively, the flow illustrated in FIG. 5 may be implemented by having hardware and software interoperate.

First, at Step S100, the image processing device 10 obtains one frame of image data (Bayer image data) captured by the imaging device 19. Although not limited in particular, the image data obtained from the imaging device 19 has a size of 8K (horizontal 7680 pixels by vertical 4320 pixels). Note that the image processing device 10 may obtain image data of a size of 4K (horizontal 3840 pixels by vertical 2160 pixels) or a size of 2K (size of full Hi-Vision) from the imaging device 19 depending on the specifications of the imaging device 19.

Next, at Step S200, the image processing device executes a separation process of separating the image data obtained from the imaging device 19 into low-frequency components and high-frequency components, to generate low-frequency component data and high-frequency component data. The low-frequency component data is Bayer image data obtained by reducing the resolution of the original image data obtained from the imaging device 19, and has, for example, the 4K size. The high-frequency component data is, for example, brightness data having a resolution of the original image data (8K size) obtained from the imaging device 19. An example of the separation process will be illustrated with reference to FIG. 6.

Next, at Step S300, the image processing device 10 executes image processing using the low-frequency component data generated in the separation process, to generate image data (Bayer image data). The resolution of the low-frequency component data is lower than that of the original image data; therefore, the load imposed on image processing can be reduced. In addition, the image processing device 10 executes a process of removing noise from the high-frequency component data that includes the brightness components. Note that the image processing device 10 may skip the noise removal process of the high-frequency component data in the case where the synthesis process of the high-frequency component data at Step S400 can be executed appropriately.

Note that the image data of the low-frequency components after image processing may be output to the information processing device 11, in order to execute a recognition process, a tracking process, or the like of the subject. The information processing device 11 can execute a recognition process, a tracking process, or the like at higher speed and with lower power, by using the image data having a lower resolution than the image data captured by the imaging device 19.

Next, at Step S400, the image processing device executes a synthesis process of synthesizing the image data after image processing with the brightness data after noise removal, to generate synthesis image data.

Next, at Step S500, the image processing device outputs the synthesis image data to one or both of the information processing device 11 and the display device 12. Next, at Step S600, the image processing device 10 ends the process illustrated in FIG. 5 if ending the image processing, or returns the process to Step S100 if continuing the image processing.

Figure 6:
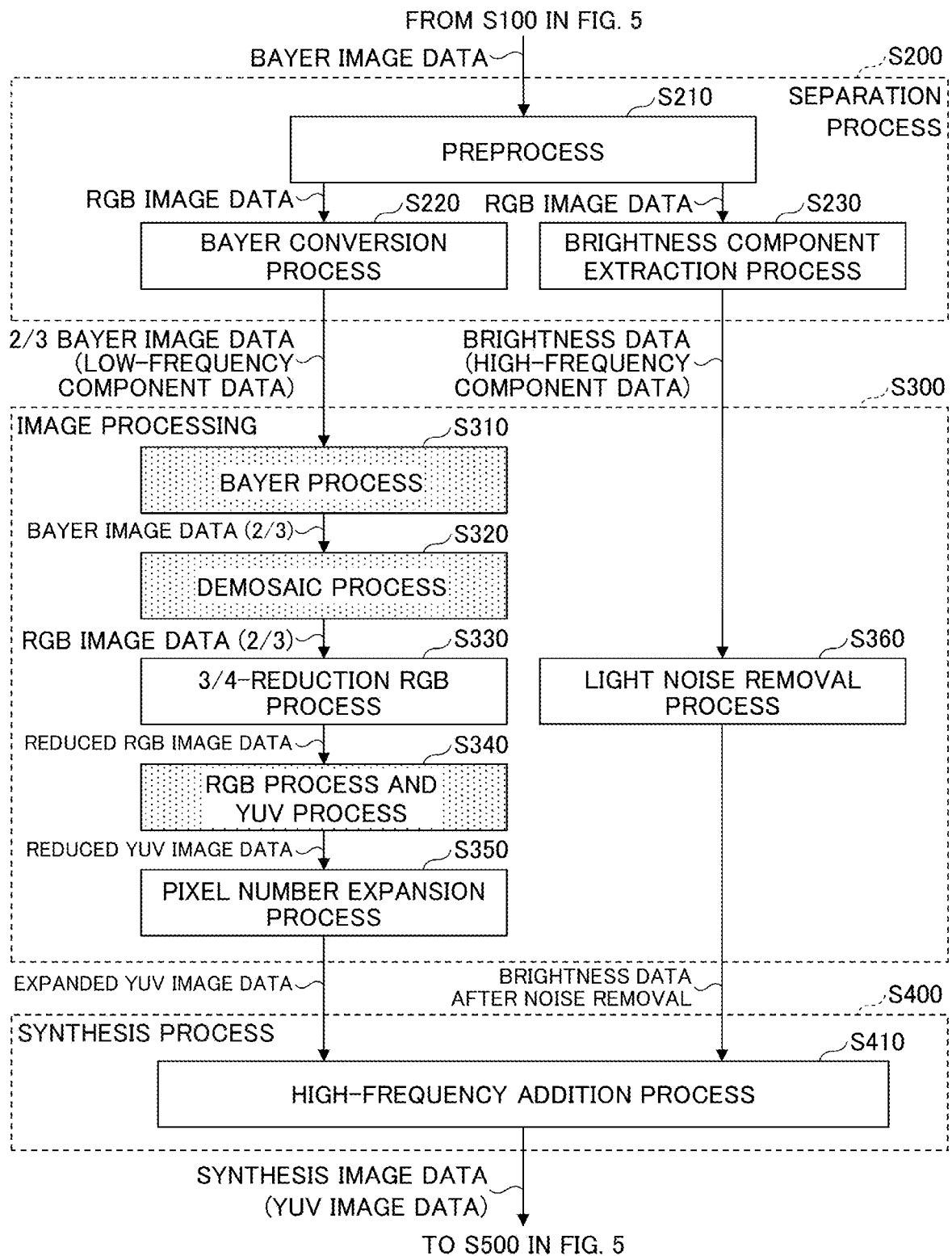
FIG. 6 is a flow chart illustrating an example of a separation process at Step S200, image processing at Step S300, and a synthesis process at Step S400 in FIG. 5.

FIG. 6 is a flow chart illustrating an example of the separation process at Step S200, the image processing at Step S300, and the synthesis process at Step S400 in FIG. 5. At Step S210, the image processing device 10 receives the Bayer image data of the 8K size obtained at Step S100 in FIG. 5, to execute a preprocess. The image processing device 10 executes minimum correction in the preprocess, to generate RGB image data for executing Steps S220 and S230. An example of the preprocess will be illustrated with reference to FIG. 7.

At Step S220, the image processing device 10 resamples the RGB image data generated in the preprocess, and executes a Bayer conversion process of generating Bayer image data in which the resolution in each of the horizontal direction and the vertical direction is reduced to ⅔. In the following, the image data (low-frequency component data) reduced in resolution by the Bayer conversion process is also referred to as ⅔ Bayer image data. An example of the Bayer conversion process will be illustrated with reference to FIG. 8.

At Step S230, the image processing device 10 executes a brightness component extraction process of extracting brightness components by using the RGB image data generated in the preprocess, to generate brightness data (high-frequency component data). An example of the brightness component extraction process will be illustrated with reference to FIG. 7.

At Step S310, by using the ⅔ Bayer image data, the image processing device 10 executes a Bayer process having a relatively high processing load, such as shading correction or noise removal of the Bayer image data. The ⅔ Bayer image data to be processed is reduced to approximately 44% (=(⅔)*(⅔) where * denotes a multiplication sign) of the number of pixels of the original image data. Therefore, the power consumption of the Bayer process can be reduced to approximately 44%. Note that in the case where an ISP is installed on the image processing device 10, by executing the Bayer process by the ISP, the Bayer process can be executed without making a significant change to the system. In this case, the Bayer process executed on the reduced image data can maintain compatibility with a Bayer process executed on image data that is not reduced. In FIG. 6 and subsequent figures, a shaded step indicates that it can be executed by the ISP.

Next, at Step S320, the image processing device 10 executes a demosaic process, to convert the Bayer image data into RGB image data. The resolutions in the horizontal direction and in the vertical direction of the converted RGB image data are ⅔ of the resolutions in the horizontal direction and in the vertical direction of the image data received from the imaging device 19. Note that in the case where an ISP is installed on the image processing device 10, it is favorable that the demosaic process is executed by the ISP.

Next, at Step S330, by using the RGB image data converted in the demosaic process, the image processing device 10 executes a ¾-reduction RGB process of generating reduced RGB image data in which the resolution in each of the horizontal direction and the vertical direction is reduced to ¾. The reduced RGB image data is reduced to 25% (square of ((⅔)/(¾))) of the number of pixels of the original image data.

The reduced RGB image data includes an R (red) component, a G (green) component, and a B (blue) component in every pixel. Therefore, even if the resolution in each of the horizontal direction and the vertical direction is reduced to ½ with respect to the image data received from the imaging device 19, the signal components are included only up to "¼*sampling rate Fs" due to the a low pass filtering (LPF) process executed at Step S213; therefore, degradation of the signal components of the received image data does not occur.

At Step S340, by using the reduced image data, the image processing device 10 executes an RGB process having a high process load such as a color correction process that includes white balancing, an edge enhancement, and the like, or a three-dimensional noise reduction (3DNR) process. In addition, after executing the RGB process, the image processing device 10 executes a conversion process into the YUV space, and executes a YUV process on the YUV image data generated by the conversion process, to generate reduced YUV image data. The number of pixels of the reduced image data is 25% (corresponding to the 4K size) of the number of pixels of the image data received from the imaging device 19, the power consumption required for the processing at Step S340 can be reduced to 25% of the power consumption in the case of processing RGB image data of the 8K size. Note that in the case where an ISP is installed on the image processing device 10, it is favorable that the RGB process and the YUV process are executed by the ISP.

Next, at Step S350, the image processing device 10 executes a pixel number expansion process of doubling the number of pixels in each of the horizontal direction and the vertical direction of the reduced YUV image data, to generate expanded YUV image data (8K size). Note that the expanded YUV image data is magnified twice in each of the horizontal direction and the vertical direction by a method such as bilinear interpolation, the actual resolution remains as in the 4K size.

Meanwhile, at Step S360, the image processing device 10 executes a light noise removal process of removing a minimum amount of noise from the high-frequency component data (brightness data) extracted at Step S230, to generate noise-removed brightness data. By executing the light noise removal process, for example, the synthesis process at Step S400 can be executed appropriately. Note that the light noise removal process may be skipped. In addition, at Step S360, the image processing device 10 may execute an enhancement process of enhancing the high-frequency component data by applying a gain.

At Step S410, the image processing device 10 executes a high-frequency addition process of adding the noise-removed brightness data (high-frequency component data) to the expanded YUV image data (low-frequency component data). By executing the high-frequency addition process, synthesis image data (YUV image data) that has the same 8K size as the image data received from the imaging device 19 and has the image processing applied can be generated. The generated YUV image data is output to one or both of the information processing device 11 and the display device 12 at Step S500 in FIG. 5.

Here, a moving image is normally used by lowering the resolution of color (UV) with respect to brightness (Y), and there is little degradation in image quality caused by lowering the resolution of color. Therefore, synthesis image data (YUV image data) with little degradation in image quality can be generated even if using color (UV) data having a substantially lower resolution than the brightness (Y) data.

Figure 7:
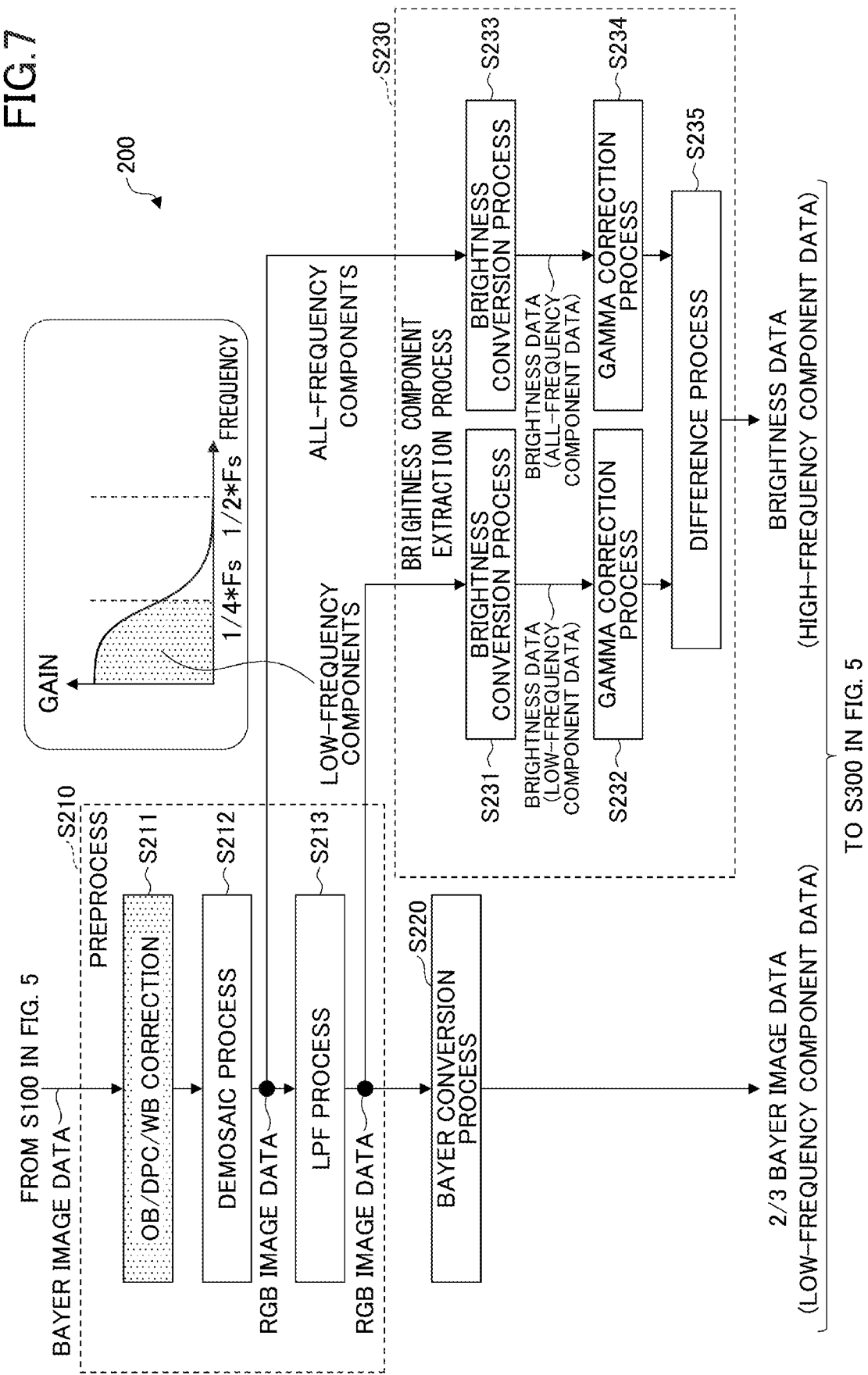
FIG. 7 is a flow chart illustrating details of the separation process at Step S200 in FIG. 6.

FIG. 7 is a flow chart illustrating details of the separation process at Step S200 in FIG. 6. First, at Step S211, the image processing device 10 executes a minimal correction process in order to execute a demosaic process on the Bayer image data. For example, the image processing device 10 executes black level correction (OB), defective pixel correction (DPC), white balance correction (WB), and the like.

Next, at Step S212, the image processing device 10 executes a demosaic process, to convert the Bayer image data into RGB image data. The RGB image data generated by the demosaic process includes all frequency components. Next, at Step S213, the image processing device 10 executes an LPF process on the RGB image data generated by the demosaic process, to extract frequency components (low-frequency components) lower than "¼*Fs".

Next, in the Bayer conversion process at Step S220, as described with reference to FIG. 6, the image processing device 10 resamples the RGB image data, to generate ⅔ Bayer image data (low-frequency component data) whose resolution in each of the horizontal direction and the vertical direction is reduced to ⅔. The number of pixels of the ⅔ Bayer image data (low-frequency component data) is approximately 44% (=the square of ⅔) of the number of pixels of the original image data received from the imaging device 19.

The RGB image data after the LPF process has no high-frequency component. Therefore, resampling has little effect on degradation of image quality. However, if the resolution in each of the horizontal direction and the vertical direction is reduced to ½ by resampling, the resampling period may become less than "½*Fs", and aliasing may occur. In this embodiment, for example, by re-sampling at "⅔*Fs" slightly higher than "½*Fs", occurrences of aliasing can be suppressed. The method of resampling will be illustrated with reference to FIG. 8.

Meanwhile, in the brightness component extraction process, at Step S231, the image processing device 10 executes a brightness conversion process of extracting brightness components by multiplying each of an R value, a G value, and a B value of the RGB image data to which the LPF process is applied by a predetermined coefficient, to generate brightness data (low-frequency component data). Next, at Step S232, the image processing device 10 executes a gamma correction process on the brightness data (low-frequency component data).

At Step S233, the image processing device 10 executes a brightness conversion process of extracting brightness components by multiplying each of an R value, a G value, and a B value of the RGB image data to which the demosaic process is applied by a predetermined coefficient, to generate brightness data (all-frequency component data). Next, at Step S234, the image processing device 10 executes a gamma correction process on the brightness data (all frequency component data).

Next, at Step S235, the image processing device calculates a difference between the brightness data (all-frequency component data) and the brightness data (low-frequency component data), to generate brightness data (high-frequency component data) that includes frequency components higher than "¼*Fs".

Figure 8:
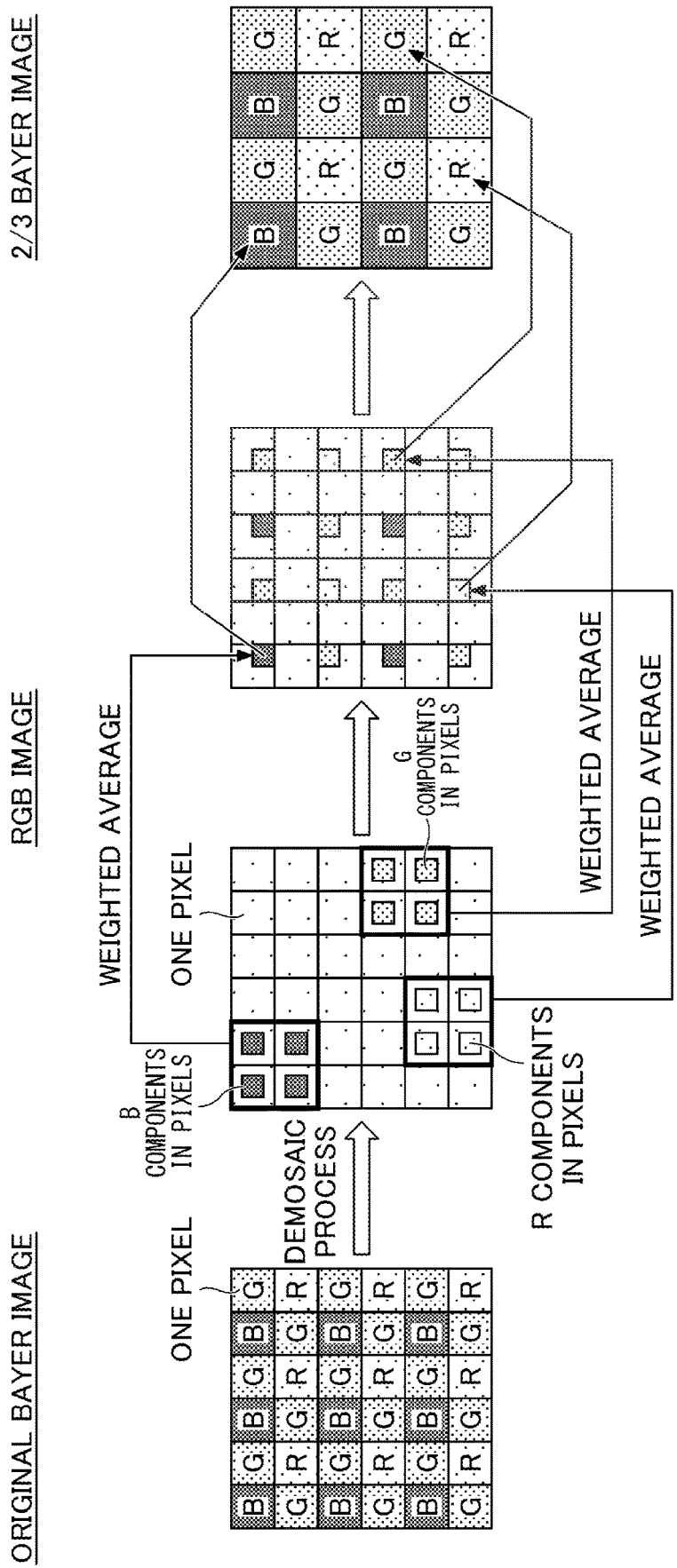
FIG. 8 is an explanatory diagram illustrating an example of a Bayer conversion process at Step S220 in FIG. 7.

FIG. 8 is an explanatory diagram illustrating an example of the Bayer conversion process at Step S220 in FIG. 7. In FIG. 8, in order to make the degree of reduction in the resolution of a Bayer image easier to understand, an original Bayer image received from the imaging device 19 is also illustrated. In addition, in order to make the description easier to understand, it is assumed that the number of pixels of the original Bayer image is six in both the horizontal direction and the vertical direction.

The original Bayer image is converted to RGB image data by the demosaic process. For example, the image processing device 10 groups multiple pixels adjacent to each other in the RGB image data, calculates a weighted average of the pixel values of the R components, the G components, or the B components for each group, and calculates the pixel value of each color on the Bayer arrangement. In the example illustrated in FIG. 8, four pixels adjacent to each other (two pixels in each of the horizontal direction and the vertical direction) are used for calculating a weighted average of the pixel values of any of the R components, the G components, and the B components. Note that the weighted average may be calculated using nine pixels (three pixels in each of the horizontal direction and the vertical direction).

Then, a ⅔ Bayer image in which the number of pixels in each of the horizontal direction and the vertical direction is reduced to ⅔ is generated. The number of pixels of the ⅔ Bayer image is approximately 44% (=the square of ⅔) of the number of pixels of the original Bayer image.

Figure 9:
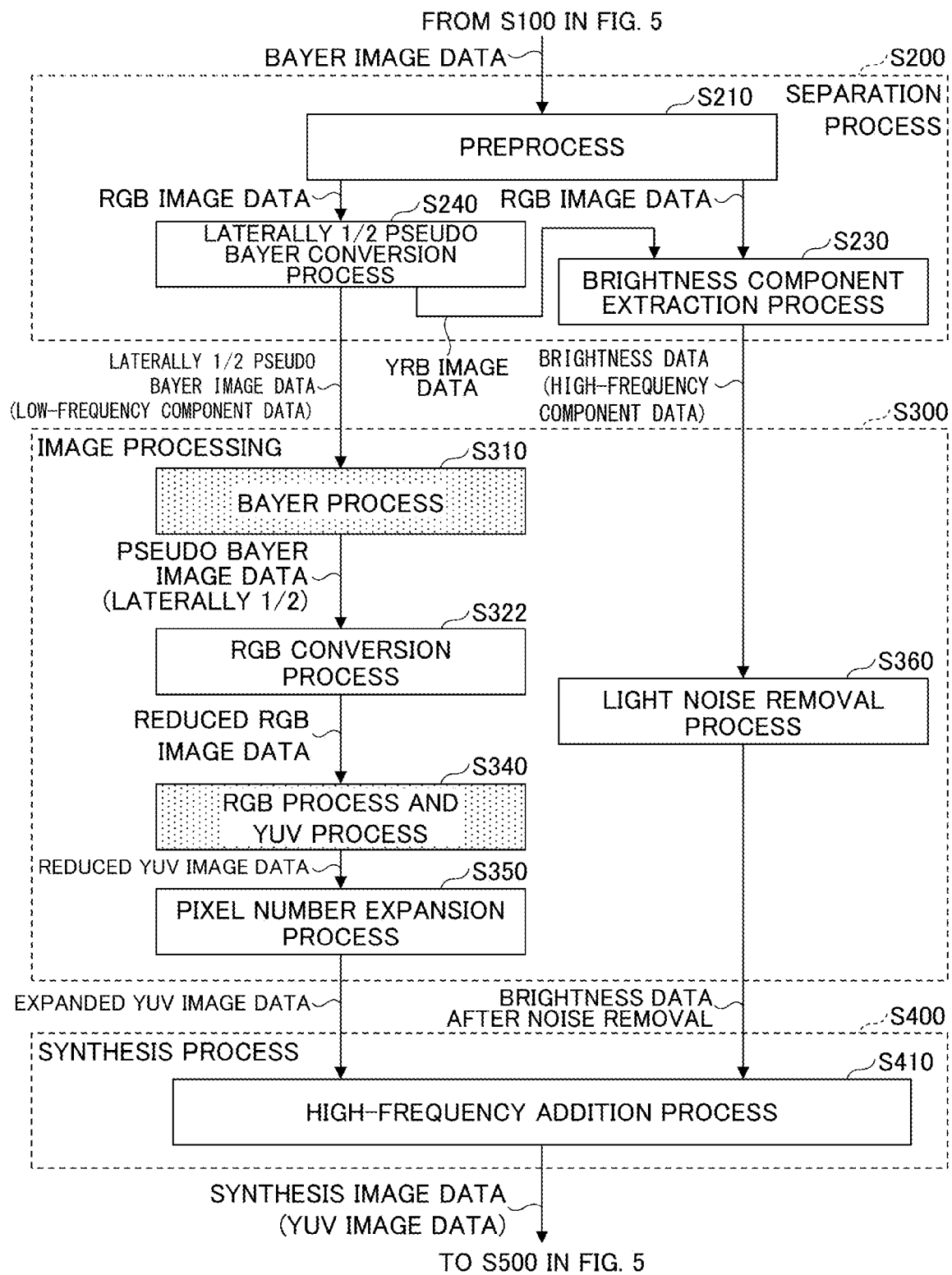
FIG. 9 is a flow chart illustrating another example of the separation process at Step S200, the image processing at Step S300, and the synthesis process at Step S400 in FIG. 5.

FIG. 9 is a flow chart illustrating another example of the separation process at Step S200, the image processing at Step S300, and the synthesis process at Step S400 in FIG. 5. Detailed description is omitted for substantially the same processing as in FIG. 6. In the separation process at Step S200, the image processing device 10 executes a laterally ½ pseudo Bayer conversion process at Step S240 instead of the Bayer conversion process at Step S220 in FIG. 6, to generate the laterally ½ pseudo Bayer image data. Here, "lateral" means the horizontal direction.

The laterally ½ pseudo Bayer image data has a resolution in the horizontal direction reduced to ½ with respect to the original Bayer image data having the 8K size. An example of the laterally ½ pseudo Bayer conversion process will be illustrated with reference to FIG. 11. In addition, in the separation process, the image processing device 10 executes the brightness component extraction process at Step S230, by using the RGB image data generated in the preprocess and YRB image data generated in the laterally ½ pseudo Bayer conversion process.

The image processing device 10 executes the image processing at Step S300, using the laterally ½ pseudo Bayer image separated by the separation process at Step S200. The laterally ½ pseudo Bayer image data is not Bayer image data; therefore, the image processing device 10 cannot use the demosaic process for generating the RGB image data.

Therefore, the image processing device 10 executes the RGB conversion process at Step S322 instead of the demosaic process and the ¾-reduction RGB process at Steps S320 and S330 in FIG. 6, to generate the reduced RGB image data. The image processing device 10 executes an inverse conversion process of the Bayer arrangement conversion process illustrated in FIG. 11, to generate reduced RGB image data having a resolution of ½ (the number of pixels is 25% of the number of pixels of the original image data) in each of the vertical direction and the horizontal direction with respect to the original image data. The other processes of the image processing at Step S300 are the same as the image processing in FIG. 6. The synthesis process at Step S400 is the same as the synthesis process in FIG. 6.

Figure 10:
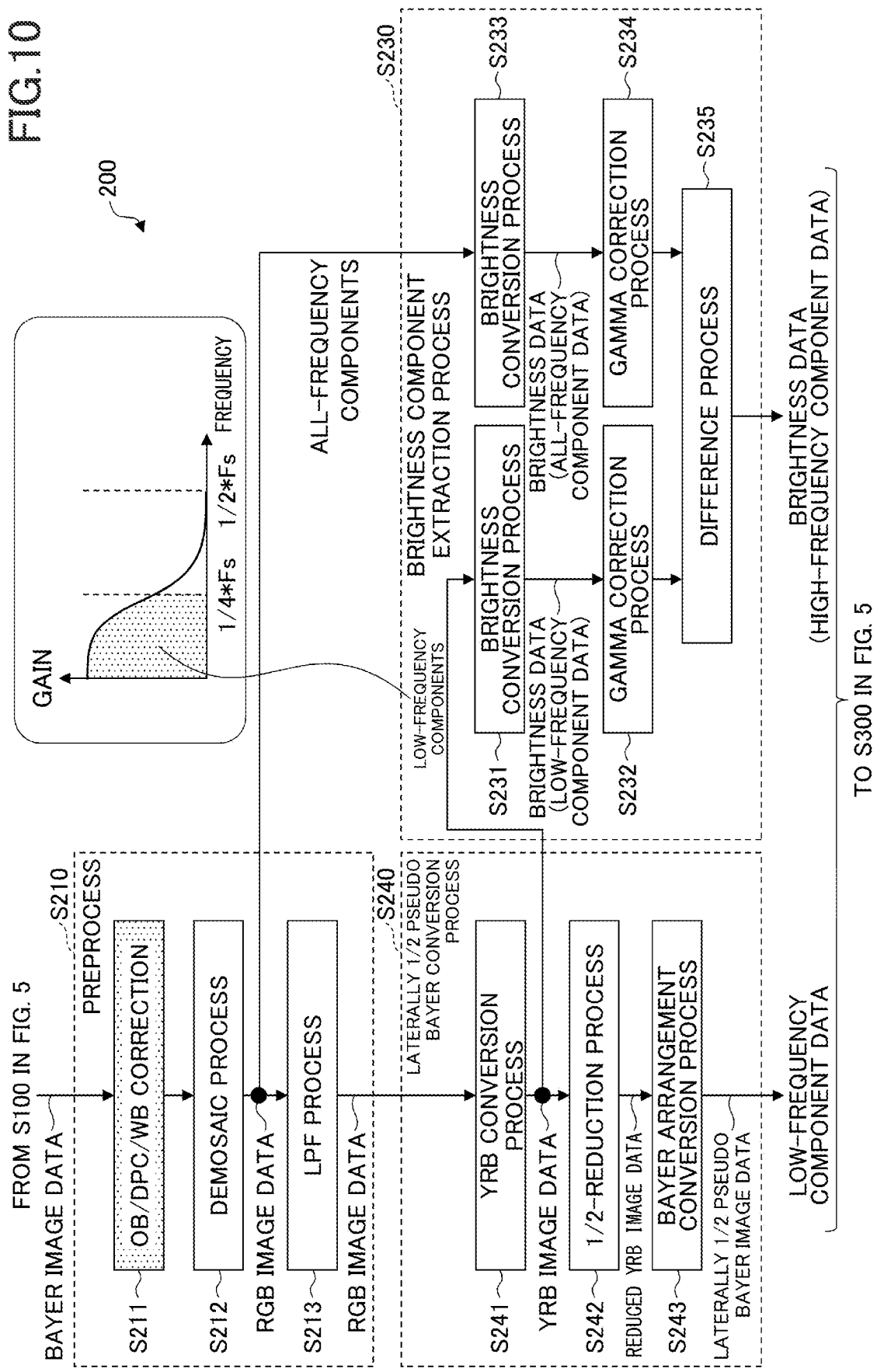
FIG. 10 is a flow chart illustrating details of the separation process at Step S200 in FIG. 9.

FIG. 10 is a flow chart illustrating details of the separation process at Step S200 in FIG. 9. Detailed description is omitted for substantially the same processing as in FIG. 7. As described with reference to FIG. 9, the separation process differs in that the laterally ½ pseudo Bayer conversion process is executed at Step S220 instead of the Bayer conversion process at Step S240 in FIG. 6. In addition, the brightness conversion process at Step S231 is executed using the YRB image data, and in this regard, different from FIG. 7. The other processes are substantially the same as in the separation process illustrated in FIG. 7.

At Step S241, the image processing device 10 executes a YRB conversion process of converting the RGB image data (low-frequency component data) from which low-frequency components are extracted by the LPF process into YRB image data in the YRB space. Next, at Step S242, the image processing device 10 executes a ½-reduction process of reducing the resolution in each of the horizontal direction and the vertical direction of the YRB image data to ½, to generate a reduced YRB image data.

Next, at Step S243, the image processing device executes a Bayer arrangement conversion process of generating YRB image data in a Bayer arrangement by thinning out the R pixels and the B pixels of the reduced YRB image data by half. In the following, the YRB image data is also referred to as laterally ½ pseudo Bayer image data. Note that in the laterally ½ pseudo Bayer conversion process at Step S240, the YUV image data in the YUV space may be used instead of the YRB image data.

Figure 11:
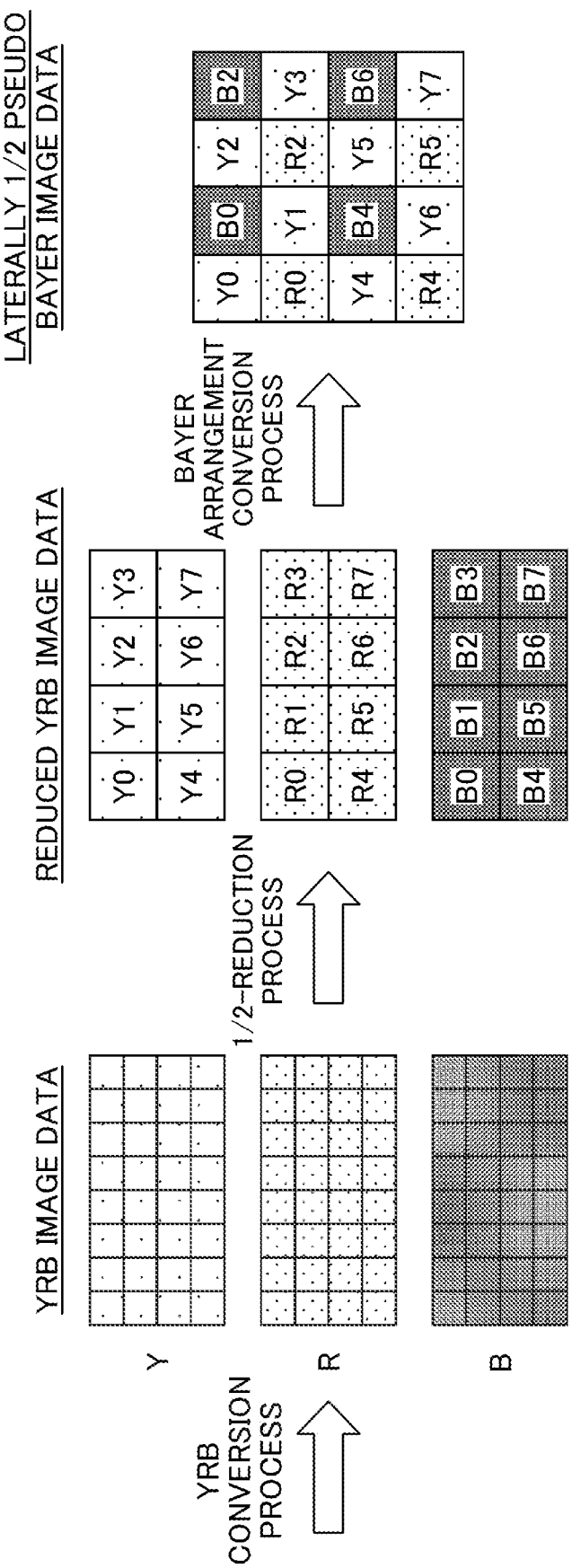
FIG. 11 is an explanatory diagram illustrating an example of a ½-reduction process at Step S242 in FIG. 10 and a Bayer arrangement conversion process at Step S243 in FIG. 10.

FIG. 11 is an explanatory diagram illustrating an example of the ½-reduction process at Step S242 in FIG. 10 and the Bayer arrangement conversion process at Step S243 in FIG. 10. The image processing device 10 executes the ½-reduction process of reducing the resolution in each of the horizontal direction and the vertical direction of the YRB image data generated by the YRB conversion process at Step S241 in FIG. 10 to ½, to generate a reduced YRB image data.

In FIG. 11, for the sake of simplification, it is assumed that the YRB image data has eight horizontal pixels and four vertical pixels, which are shown to be separated into Y values, R values, and B values. In the reduced YRB image data, pixels that indicate Y values are denoted by reference signs Y0 to Y7, pixels that indicate R values are denoted by reference signs R0 to R7, and pixels that indicate B values are denoted by reference signs B0 to B7.

The image processing device 10 arranges all the Y values of the reduced YRB image data and the R values and the B values thinned out to ½ in a Bayer arrangement, to generate laterally ½ pseudo Bayer image data. In this example, although even-numbered R and B pixels are selected in the Bayer arrangement conversion process, odd-numbered R and B pixels may be selected. Note that in the case where the YUV image data in the YUV space is used instead of the YRB image data, U pixels are used instead of the B pixels, and V pixels are used instead of the R pixels.

As above, in this embodiment, the original image data obtained from the imaging device 19 is separated to generate the low-frequency component data having a resolution lower than that of the original image data; therefore, the image processing can be executed using the low-frequency component data. Accordingly, compared with the case of applying image processing to the original image data as it is, the load imposed on image processing can be reduced. For example, compared with the case of applying image processing to the original image data as it is, image processing can be executed with lower power and at higher speed.

By generating the low-frequency component data in the Bayer arrangement in the separation process, the Bayer process and the demosaic process can be executed using an existing ISP installed on the image processing device 10, and the RGB image data can be generated. In addition, the RGB process and the YUV process can be executed on the reduced RGB image data obtained by reducing the RGB image data, by using the existing ISP.

Also in the case where the laterally ½ pseudo Bayer image data is generated in the separation process and the laterally ½ pseudo Bayer image data is processed in the image processing, compared with the case of applying the image processing to the original image data as it is, the load imposed on image processing can be reduced. As a result, image processing can be executed with lower power and at higher speed.

By synthesizing the low-frequency component data and the high-frequency component data after image processing by the synthesis process, synthesis image data having the same resolution as the image data received from the imaging device 19 can be generated.

In addition, by executing a recognition process, tracking process, or the like of the subject by using the reduced RGB image data or reduced YUV image data generated by the image processing at Step S300 in FIG. 6, the recognition process, tracking process, or the like can be executed at higher speed and with lower power.

Second Embodiment

Figure 12:
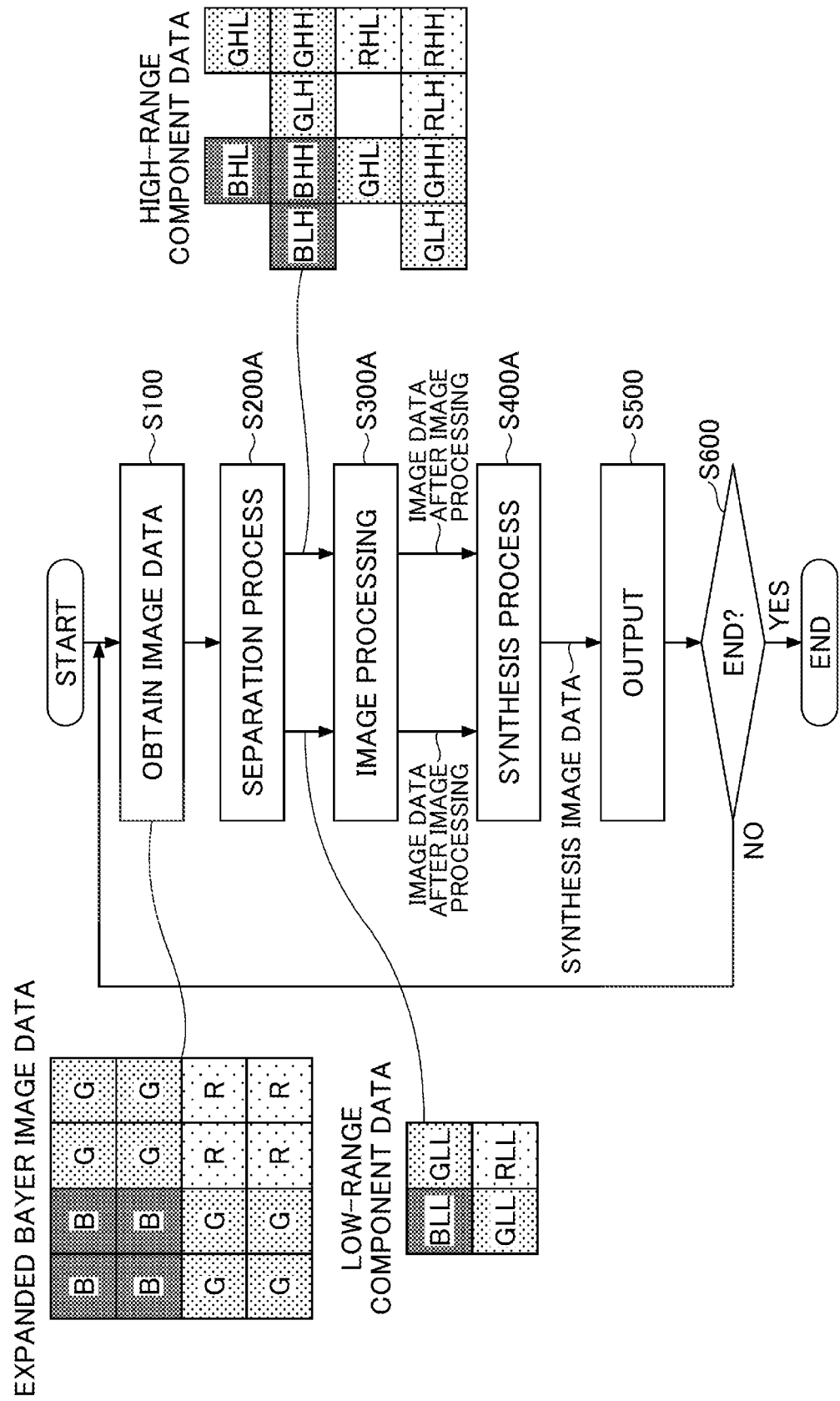
FIG. 12 is a flow chart illustrating an example of image processing executed by an image processing device according to a second embodiment.

FIG. 12 is a flow chart illustrating an example of image processing executed by an image processing device according to a second embodiment. In other words, FIG. 12 illustrates an example of a method of image processing executed by an image processing device. Detailed description is omitted for substantially the same processes as in the embodiments described above. The image processing device 10 that executes the flow illustrated in FIG. 12 is substantially the same as the image processing device 10 illustrated in FIGS. 1 to 3, and installed in an image processing system 100 with an information processing device 11 and a display device 12. In addition, the image processing device 10 that executes the flow illustrated in FIG. 12 has the substantially same functional configuration as in FIG. 4.

The flow illustrated in FIG. 12 is implemented, for example, by the CPU 20 of the image processing device 10 executing an image processing program. Note that the flow illustrated in FIG. 12 may be implemented by hardware such as an FPGA or an ASIC installed in the image processing device 10. Alternatively, the flow illustrated in FIG. 12 may be implemented by having hardware and software interoperate.

In this embodiment, the image sensor IMGS (FIG. 2) installed on the imaging device 19 has, as a basic pixel group, an expanded pixel group that includes 16 pixels of an expanded Bayer arrangement obtained by expanding each pixel of one B pixel, one R pixel, and two G pixels in the Bayer arrangement to four pixels.

In the following, image data obtained by the imaging device 19 having the image sensor IMGS having the expanded Bayer arrangement is also referred to as expanded Bayer image data. In addition, the four pixels expanded for each pixel in the Bayer arrangement are also referred to as a pixel group. The expanded Bayer image data is an example of image data, in which pixel values of multiple pixels corresponding to two pixel groups on one diagonal are green information; pixel values of multiple pixels corresponding to one of two pixel groups on the other diagonal are red information; pixel values of multiple pixels corresponding to the other of the two pixel groups on the other diagonal are blue information; and four pixel groups have a Bayer arrangement. Note that the number of pixels of the pixel group may be nine pixels or may be six pixels. In this case, the number of pixels in the expanded pixel group is 36 pixels or 24 pixels.

The image processing device 10 in this embodiment executes Steps S200A, S300A, and S400A instead of Steps S200, S300, and S400 in FIG. 5. The processing at Steps S100, S500, and S600 are substantially the same as the processing at Steps S100, S500, and S600 in FIG. 5. However, at Step S100, the image processing device 10 obtains one frame of expanded Bayer image data captured by the imaging device 19. Although not limited in particular, the resolution of one frame of the expanded Bayer image data corresponds to the 8K size.

At Step S200A, the image processing device 10 separates each of the four pixel groups of the expanded Bayer image data into low-range components and high-range components, to generate low-range component data that includes four pixels and high-range component data that includes twelve pixels. The identifier LL following the color (B, G, G, R) of each pixel of the low-range component data indicates that the pixel includes low-range component data. The identifiers HL, LH, and HH following the color (B, G, G, R) of each pixel of the high-range component data indicates that the pixel includes high-range component data. The identifiers will be described with reference to FIG. 13.

In the case where the resolution of the expanded Bayer image data corresponds to the 8K size, the resolution of the low-range component data corresponds to the 4K size. The four pixels of the low-range component data are Bayer image data. In this way, by separating the low-range component data from the expanded Bayer image data, the Bayer image data can be generated. Note that also in the pixels identified with the identifiers HL, LH, and HH, by collecting four pixels for each of the identifiers HL, LH, and HH, image data can be formed.

Next, at Step S300A, the image processing device 10 executes image processing on each of the low-range component data and the high-range component data, to generate image data after image processing. By executing the image processing using the low-range component data having a lower resolution than the expanded Bayer image data, as in the first embodiment, the load on the image processing can be reduced, and the image processing can be executed with lower power and at higher speed.

Next, at Step S400A, the image processing device 10 executes a synthesis process of synthesizing image data after image processing of the low-range component data with image data after image processing of the high-range component data, to generate synthesis image data. By synthesizing the low-range component data after image processing and the high-range component data after image processing by the synthesis process, synthesis image data having the same resolution as the image data received from the imaging device 19 can be generated.

Figure 13:
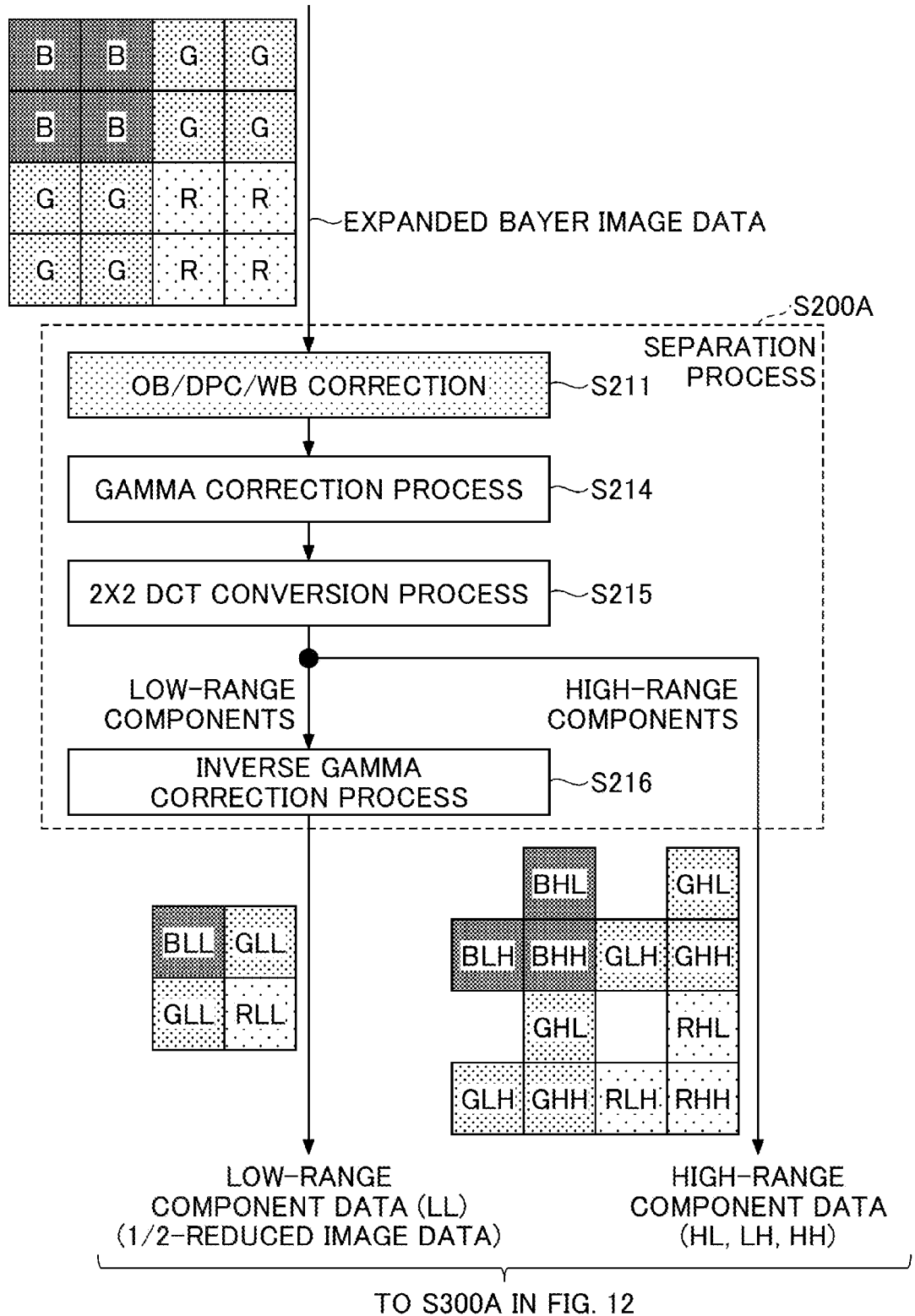
FIG. 13 is a flow chart illustrating an example of a separation process at Step S200A in FIG. 12.

FIG. 13 illustrates an example of the separation process at Step S200A in FIG. 12. Detailed description is omitted for substantially the same processes as in FIG. 7. First, at Step S211, similar to FIG. 7, the image processing device 10 executes black level correction (OB), defective pixel correction (DPC), white balance correction (WB), and the like on the expanded Bayer image data. Next, at Step S214, the image processing device 10 executes a gamma correction process on the brightness data on the corrected expanded Bayer image data.

Next, at Step S215, the image processing device 10 executes a frequency conversion process such as a discrete cosine transform (DCT) process on each of the pixel groups (2 pixels×2 pixels) of the respective colors. Then, the image processing device 10 separates the image data after the DCT conversion process into low-range components and high-range components. The high-range components are generated as high-range component data (HL, LH, HH). Next, at Step S216, the image processing device 10 executes an inverse gamma correction process on the low-range component data, to generate low-range component data (LL).

The image processing device 10 extracts low-range components from the pixel values of four pixels in each of four pixel groups having the respective colors in the expanded Bayer image data, and assigns the low-range components to a pixel value of one pixel, to generate low-range component data that includes pixel values in a Bayer arrangement. For example, the low-range component data is ½-reduced image data obtained by reducing the resolution of the expanded Bayer image data to ½ in each of the horizontal direction and the vertical direction. The number of pixels of the low-range component data is 25% of the number of pixels of the expanded Bayer image data which is the original image data.

The low-range component data identifier LL indicates that the low-range component data (LL) includes low-frequency components in the horizontal direction and the vertical direction. The identifier HL of the high-range component data indicates that the high-range component data (HL) includes high-frequency components in the horizontal direction. The identifier LH of the high-range component data indicates that the high-range component data (LH) includes high-frequency components in the vertical direction. The high-range component data identifier HH indicates that the high-range component data (HH) includes high-frequency components in the horizontal direction and the vertical direction. In the following, the symbols LL, LH, HL, and HH are also referred to as frequency components.

Figure 14:
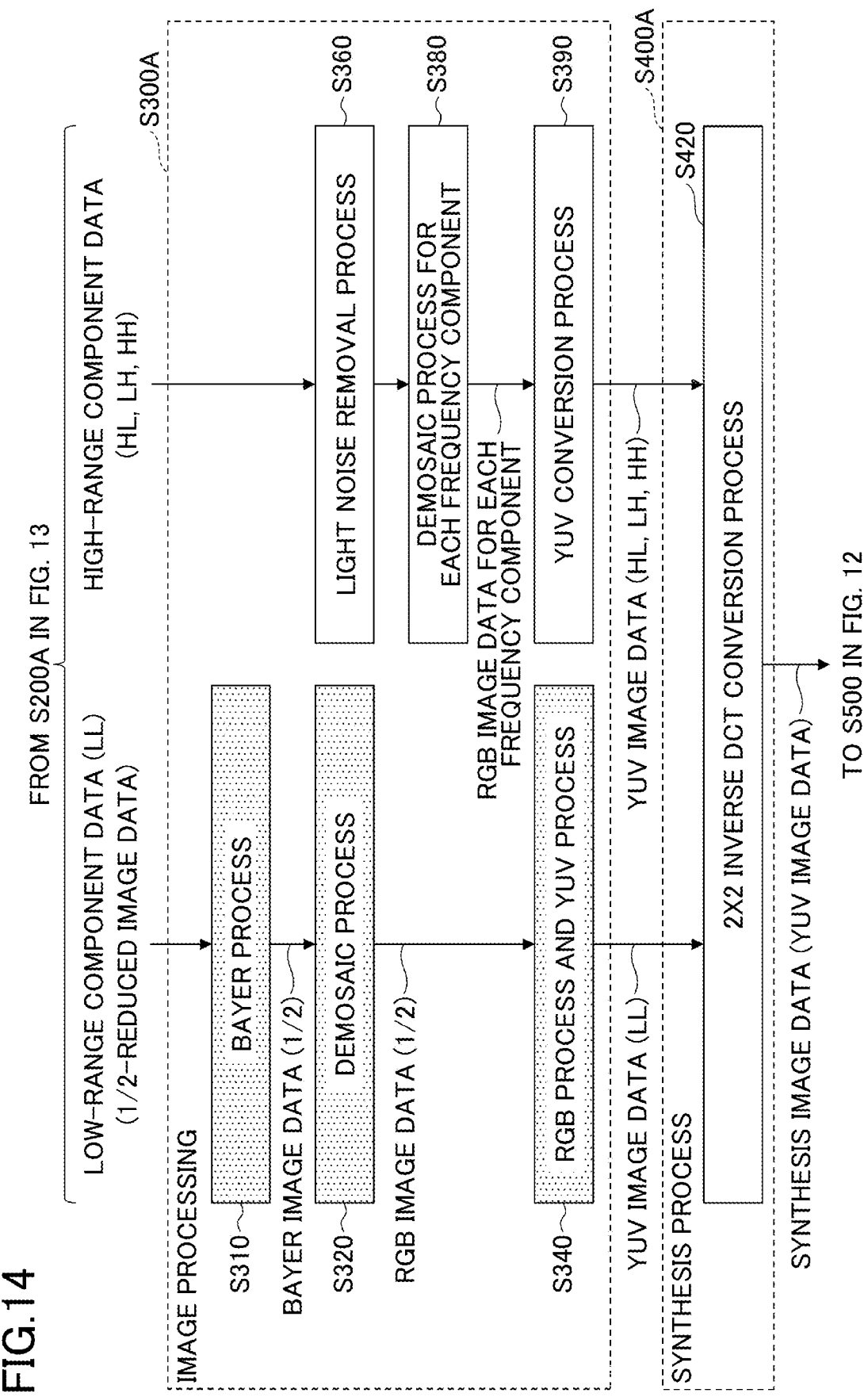
FIG. 14 is a flow chart illustrating an example of image processing at Step S300A and a synthesis process at Step S400A in FIG. 12.

FIG. 14 is a flow chart illustrating an example of the image processing at Step S300A and the synthesis process at Step S400A in FIG. 12. Detailed description is omitted for substantially the same processes as in FIG. 6. The image processing of the low-range component data is similar to the image processing of the ⅔ Bayer image data in FIG. 6 except that there is no ¾-reduction RGB process at Step S330 in FIG. 6 and no pixel number expansion process at Step S350 in FIG. 6. In other words, the image processing device 10 executes at Step S340 an RGB process and a YUV process on the RGB image data generated in the demosaic process at Step S320, to generate YUV image data (LL).

Note that the image processing of the low-range component data (LL) is executed on image data obtained by reducing the resolution in each of the horizontal direction and the vertical direction to ½ (reduced to ¼ in terms of the area). Therefore, the power consumption can be reduced to approximately 25% as compared with the case where image processing is executed on the original expanded Bayer image data before reduction. In addition, the time required for image processing can also be reduced.

Normally, in the case where image processing is executed on the expanded Bayer image data obtained by the image sensor IMGS having the expanded Bayer arrangement, after converted into image data having the same size as that of the expanded Bayer image, a Bayer process, a demosaic process, an RGB process, and the like are executed in order. In contrast, in this embodiment, the image processing is executed after the low-range component data (LL) in the Bayer arrangement is generated from the expanded Bayer image data; therefore, the conversion process on the image data can be skipped. In addition, the area of the low-range component data is reduced to ¼ of that of the expanded Bayer image; therefore, the power consumption required for the image processing can be reduced.

In the image processing of the high-range component data, the image processing device 10 executes a light noise removal process at Step S360 as in FIG. 6, and then, executes Steps S380 and S390, to generate the YUV image data corresponding to the high-range component data.

At Step S380, the image processing device 10 executes a demosaic process on image data (in the Bayer arrangement) that includes four pixels of the respective frequency components HL, LH, and HH, to generate RGB image data for each frequency component.

Next, at Step S390, the image processing device 10 executes a YUV conversion process on the respective RGB image data items of the frequency components HL, LH, and HH, to generate YUV image data (HL, LH, and HH) for each of the frequency components HL, LH, and HH.

Next, at Step S420, the image processing device combines the YUV image data (LL) and the YUV image data (HL, LH, and HH), to generates YUV image data in the expanded Bayer arrangement. Then, by executing an inverse DCT conversion process on each of pixel groups (2 pixels×2 pixels) of the respective colors of the YUV image data in the expanded Bayer arrangement, the low-range component and the high-range component of the YUV image data are synthesized, to generate synthesis image data (YUV image data).

Figure 15:
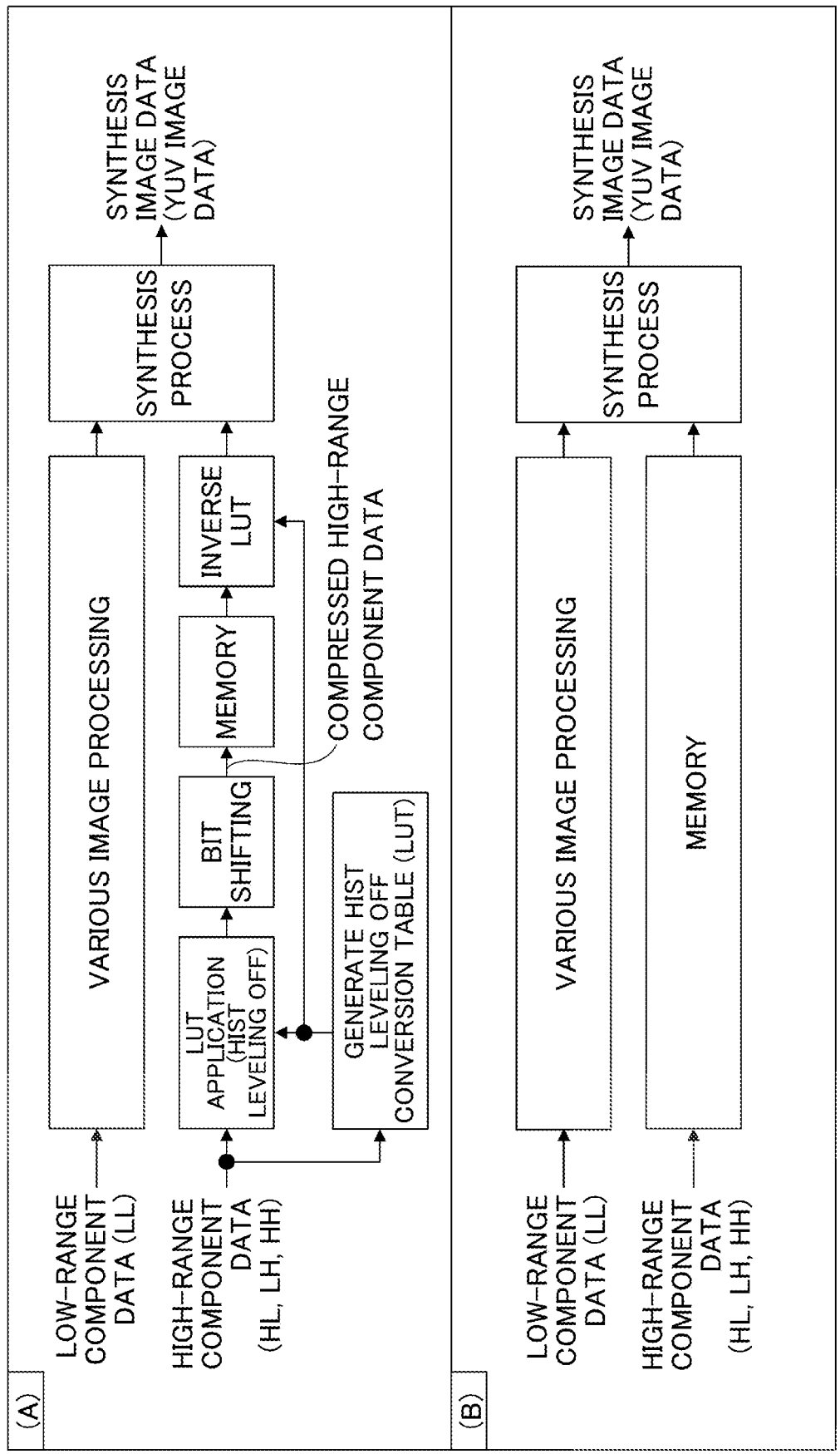
FIG. 15 is a diagram illustrating an improvement example in which the power consumption is further reduced in the image processing at Step S300A in FIG. 12.

FIG. 15 is a diagram illustrating an improvement example in which the power consumption is further reduced in the image processing at Step S300A in FIG. 12. Image processing of the low-range component data is more complex and time-consuming than image processing of high-range component data. In order to adjust the timing of the synthesis process of the low-range component data and the high-range component data, the high-range component data is buffered in the memory before or after image processing. The high-range component data has a higher resolution and a larger data size than the low-range component data. Therefore, the storage capacity of the memory for holding the high-range component data increases, and the power consumption also increases.

In FIG. 15A illustrating an improvement example, the image processing device 10 generates a conversion table (e.g., a look-up table LUT) for leveling off the histogram of the high-range component data in the image processing at Step S300A in FIG. 14. The image processing device 10 executes a leveling-off process of leveling off the histogram of the high-range component data based on the generated conversion table.

Next, the image processing device 10 executes a bit-shifting process of bit-shifting each pixel value of the high-range component data in which the histogram is leveled off, to discard lower bits so as to reduce the number of bits. Accordingly, compressed high-range component data in which the data size of the high-range component data is reduced is generated. Note that in the bit-shifting, a rounding process of truncated bits may be implemented.

Then, the image processing device 10 stores the compressed high-range component data in the memory. Thereafter, the image processing device 10 reads the compressed high-range component data from the memory, and executes a restoration process of restoring the original high-range component data by inverse transformation using the look-up table LUT. Note that data compression by the bit-shifting process is lossy compression. Thereafter, the restored high-range component data is synthesized with the low-range component data on which the image processing has been completed, to generate synthesis image data (YUV image data).

By leveling off the histogram, useful information having a high frequency of occurrence can be maintained even in the case where the number of bits is reduced by bit-shifting. Accordingly, degradation in image quality due to reduction in the number of bits can be minimized. In addition, by reducing the number of bits, the capacity of the memory for storing the high-range component data can be suppressed, and the power consumption of the memory can be suppressed.

Note that the process of compressing the high-range component data, the process of storing the high-range component data in the memory, the process of reading the high-range component data from the memory, and the process of restoring illustrated in FIG. 15A can be executed at any timing between before Step S360 and after Step S390 in FIG. 14. In addition, the process illustrated in the FIG. 15A may be applied to the first embodiment.

In contrast, in the case where the leveling-off of the histogram and the bit-shifting of the high-range component data are not executed, the high-range component data is stored in the memory without being compressed as illustrated in FIG. 15B. The high-range component data stored in the memory is read from the memory in synchronization with the completion timing of the image processing of the low-range component data, and the synthesis process with the low-range component data is executed. In this case, the capacity of the memory in which the high-range component data is stored is larger than in FIG. 15A, and the power consumption of the memory is also larger.

As above, also in this embodiment, substantially the same effects as in the embodiment described above can be obtained. For example, also in the case of receiving the expanded Bayer image data from the imaging device 19, by separating the low-range component data from the expanded Bayer image data, the image processing can be executed using the Bayer image data whose resolution is reduced. Accordingly, as compared with the case of applying image processing to the expanded Bayer image data as it is, the load imposed on the image processing can be reduced, and the image processing can be executed with lower power and at higher speed.

Further, in this embodiment, as the low-range component data in the Bayer arrangement is separated from the expanded Bayer image data, the image processing can be executed using an existing ISP. In other words, after separating the low-range component data, a conversion process of the image data can be skipped, and the image processing on the image data can be executed directly.

By reducing the data size of the high-range component data separated from the expanded Bayer image data by leveling off the histogram and bit-shifting, the capacity of the memory for holding the high-range component data can be suppressed, and the power consumption of the memory can be suppressed.

Third Embodiment

Figure 16:
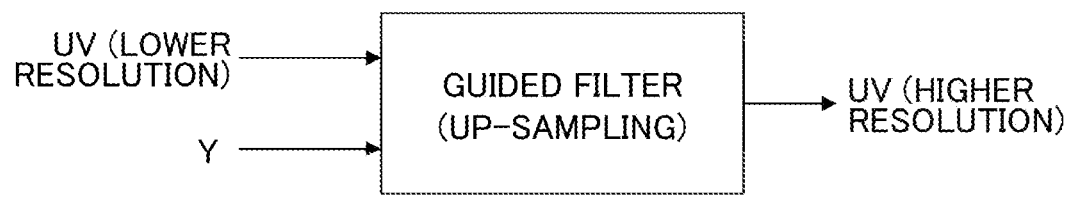
FIG. 16 is a flow chart illustrating an example of image processing executed by an image processing device according to a third embodiment.

FIG. 16 is a flow chart illustrating an example of image processing executed by an image processing device according to a third embodiment. In other words, FIG. 16 illustrates an example of a method of image processing executed by an image processing device. Detailed description is omitted for substantially the same processes as in the embodiments described above. The image processing device 10 that executes the flow illustrated in FIG. 16 is substantially the same as the image processing device 10 illustrated in FIGS. 1 to 3, and installed in an image processing system 100 with an information processing device 11 and a display device 12. In addition, the image processing device 10 that executes the flow illustrated in FIG. 16 has substantially the same functional configuration as in FIG. 4.

In the first embodiment and the second embodiment described above, although the high resolution is maintained for the brightness components Y, the resolution is lowered for the color difference components UV (or the RGB components). Therefore, in this embodiment, by executing an up-sampling process of up-sampling the color difference components UV using the brightness components, color difference components UV having a high resolution can be generated. For example, by using the brightness components as a guide image and applying a guided filter to the color difference components UV, the resolution of the color components can be increased according to the texture of the brightness components.

For example, the guided filter process is applied to the YUV image data generated by the high-frequency addition process at Step S410 in FIGS. 6 and 9 or the inverse DCT conversion process at Step S420 in FIG. 14. Note that the guided filter process may be applied to the YUV image data generated by the synthesis process of 15A.

As above, also in this embodiment, substantially the same effects as in the embodiments described above can be obtained. Further, in this embodiment, in the synthesis image data (YUV image data) synthesized by the synthesis process, by up-sampling the color difference components UV by the guided filter, color difference components UV having a high resolution can be generated.

As above, the present inventive concept has been described based on the respective embodiments; note that the present disclosure is not limited to the requirements set forth in the embodiments described above. These requirements can be changed within a scope not to impair the gist of the present disclosure, and can be suitably defined according to applications.

For example, the processing in the embodiments described above may be executed only during a low-power mode; during a normal mode, full image data of the 8K size may be used for execution. In this case, in the image processing at Step S300 in FIG. 6, during the normal mode, the Bayer process, the demosaic process, the RGB process and the YUV process are executed on the full image. During the normal mode, the processes at Steps S330, S350, and S360 are bypassed. During the normal mode, the synthesis process at Step S400 is bypassed.

In the separation process at Step S200 in FIG. 7, during the normal mode, only the black level correction (OB), the defective pixel correction (DPC), and the white balance correction (WB) at Step S211 are executed on the full image. During the normal mode, the processes at Step S212, S213, S220, and S230 are bypassed.

In the image processing at Step S300 in FIG. 9, during the normal mode, the Bayer process, the RGB process, and the YUV process are executed on the full image, and instead of Step S322, the demosaic process is executed on the full image. During the normal mode, the processes at Step S350 and S360 are bypassed. During the normal mode, the synthesis process at Step S400 is bypassed.

In the separation process at Step S200 in FIG. 10, during the normal mode, only the black level correction (OB), the defective pixel correction (DPC), and the white balance correction (WB) at Step S211 are executed on the full image. During the normal mode, the processes at Step S212, S213, S230, and S240 are bypassed.

In the separation process at Step S200A in FIG. 13, during the normal mode, only the black level correction (OB), the defective pixel correction (DPC), and the white balance correction (WB) at Step S211 are executed on the full image. The processes at Step S214, S215, and S216 are bypassed. In the image processing at Step S300A in FIG. 14, during the normal mode, the Bayer process, the demosaic process, the RGB process and the YUV process are executed on the full image. During the normal mode, the process at Step S360, S380, and S390 are bypassed, and the synthesis process at Step S400 is bypassed.

For example, examples of switching between the normal mode and the low-power mode include the following cases (1), (2), and (3). (1) to (3) may function alone, or may function in combination of two or more of these.
(1) The user selects whether the recording mode is set to the normal mode or the low-power mode.
(2) When the temperature of a device on which the image processing device 10 is installed becomes higher than or equal to a predetermined temperature, the normal mode is switched to the low-power mode.
(3) In the case where a device on which the image processing device 10 is installed operates with a battery, when the remaining capacity of the battery becomes less than or equal to a predetermined amount, the normal mode is switched to the low-power mode.

What is claimed is:

1. An image processing device comprising:
a memory; and
a processor configured to separate first image data obtained by an image sensor having a Bayer arrangement, into second image data that includes brightness information, and third image data that includes color information and has a lower resolution than the first image data and the second image data,
wherein a pixel arrangement of the third image data includes two pixels in each of a horizontal direction and a vertical direction, among which two pixels on one diagonal are of a same type, two pixels on another diagonal are of types different from each other, and the two pixels on said another diagonal are of the types different from the two pixels on the one diagonal.

2. The image processing device as claimed in claim 1, wherein the processor is further configured to execute image processing on the third image data, to generate fourth image data.

3. The image processing device as claimed in claim 2, wherein the third image data includes pixel values of pixels in a Bayer arrangement, and
wherein the processor executes the image processing after converting the third image data into RGB image data by a demosaic process.

4. The image processing device as claimed in claim 2, wherein in the third image data, the two pixels on the one diagonal include brightness information, and the two pixels on said another diagonal respectively include red information and blue information, and
wherein the processor executes the image processing after converting the third image data into RGB image data by an RGB conversion process.

5. The image processing device as claimed in claim 2, wherein the processor executes a leveling-off process of leveling off a histogram with respect to the second image data, executes a bit-shifting process of discarding a lower bit of each pixel value of the image data to which the leveling off process is applied, holds the image data to which the bit-shifting process is applied in the memory, and executes a restoration process of restoring the second image data from the image data held in the memory, and
wherein the image data after the restoration process is synthesized with the fourth image data.

6. The image processing device as claimed in claim 2, wherein the processor is further configured to synthesize the second image data or fifth image data generated by image processing on the second image data with the fourth image data, to generate sixth image data.

7. The image processing device as claimed in claim 6, wherein the processor generates the sixth image data that includes brightness components and color difference components, and executes an up-sampling process on the generated sixth image data to up-sample the color difference components using the brightness components.

8. The image processing device as claimed in claim 6, wherein the sixth image data has a same resolution as the first image data.

9. The image processing device as claimed in claim 1, wherein the processor executes a demosaic process on the first image data, to generate RGB image data,
generates the third image data by extracting low-frequency components from the RGB image data, and
generates the second image data by obtaining a difference between brightness information on the RGB image data and brightness information on the third image data.

10. The image processing device as claimed in claim 1, wherein the first image data includes pixel values of four pixel groups arranged two by two in each of the horizontal direction and the vertical direction, and
wherein pixel values of multiple pixels corresponding to two pixel groups on one diagonal are green information; pixel values of multiple pixels corresponding to one of two pixel groups on another diagonal are red information; pixel values of multiple pixels corresponding to another of the two pixel groups on said another diagonal are blue information; and the four pixel groups have a Bayer arrangement, and
wherein the processor extracts low-range components from the pixel values of multiple pixels in each of the four pixel groups, and assigns the low-range components to a pixel value of one pixel, to generate the third image data that includes pixel values in a Bayer arrangement.

11. The image processing device as claimed in claim 10, wherein the processor extracts wide-range components from the pixel values of the multiple pixels in each of the four pixel groups, and assigns the wide-range components to pixels other than the pixel to which the pixel values of the low-range components are assigned, to generate the second image data.

12. The image processing device as claimed in claim 1, wherein
the second image data corresponds to the high frequency component, and
the third image data corresponds to a low frequency component lower in a frequency than the high frequency component.

13. An image processing method of processing image data, executed by an image processing device including a memory and a processor, the method comprising:
separating first image data obtained by an image sensor having a Bayer arrangement, into second image data that includes brightness information, and third image data that includes color information and has a lower resolution than the first image data and the second image data,
wherein a pixel arrangement of the third image data includes two pixels in each of a horizontal direction and a vertical direction, among which two pixels on one diagonal are of a same type, two pixels on another diagonal are of types different from each other, and the two pixels on said another diagonal are of the types different from the two pixels on the one diagonal.

* * * * *